(12) United States Patent
Lin

(10) Patent No.: US 9,054,464 B1
(45) Date of Patent: Jun. 9, 2015

(54) POWER SUPPLY CONNECTION STRUCTURE DEVICE

(71) Applicant: Shenzhen Zhongke Electrical Technology Co., LTD, Shenzhen, Guangdong (CN)

(72) Inventor: Shifeng Lin, Shenzhen (CN)

(73) Assignee: SHENZHEN ZHONGKE ELECTRICAL TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 14/333,487

(22) Filed: Jul. 16, 2014

Related U.S. Application Data

(63) Continuation of application No. 14/239,147, filed on Feb. 16, 2014.

(51) Int. Cl.
| | |
|---|---|
| H01R 29/00 | (2006.01) |
| H01R 13/703 | (2006.01) |
| H01R 43/26 | (2006.01) |
| H01R 43/00 | (2006.01) |

(52) U.S. Cl.
CPC ............ *H01R 13/703* (2013.01); *H01R 43/26* (2013.01); *H01R 43/005* (2013.01)

(58) Field of Classification Search
CPC ........... H01R 2103/00; H01R 13/7032; H01R 13/703; H01R 13/7033; H01R 24/46
USPC .................................................. 439/188, 189
See application file for complete search history.

(56) References Cited

U.S. PATENT DOCUMENTS

| | | | | |
|---|---|---|---|---|
| 4,094,565 | A * | 6/1978 | Parrier et al. ................. | 439/106 |
| 4,408,171 | A * | 10/1983 | Akino et al. .................. | 333/177 |
| 4,760,357 | A * | 7/1988 | Yamaguchi ................... | 333/181 |
| 5,069,632 | A * | 12/1991 | Avitan .......................... | 439/188 |
| 5,340,944 | A * | 8/1994 | Wang ............................ | 174/350 |
| 5,475,347 | A * | 12/1995 | Kwak ........................... | 333/185 |
| 5,616,045 | A * | 4/1997 | Gauker ......................... | 439/352 |
| 5,661,623 | A * | 8/1997 | McDonald et al. ............. | 361/42 |
| 5,746,618 | A * | 5/1998 | Gauker ......................... | 439/352 |
| 6,122,155 | A * | 9/2000 | Aromin et al. ................. | 361/42 |
| 6,478,626 | B2 * | 11/2002 | Dingenotto et al. ..... | 439/620.14 |
| 6,624,991 | B2 * | 9/2003 | Chu ............................... | 361/42 |
| 7,068,038 | B2 * | 6/2006 | Mason et al. .................. | 324/508 |
| 7,121,899 | B2 * | 10/2006 | Homann et al. ............... | 439/680 |
| 7,672,098 | B2 * | 3/2010 | Zhang et al. .................. | 361/42 |
| 7,744,419 | B2 * | 6/2010 | Blum et al. ................. | 439/620.1 |
| 7,967,609 | B2 * | 6/2011 | Capece et al. ................. | 439/39 |
| 8,142,208 | B2 * | 3/2012 | Ruffner ......................... | 439/105 |
| 8,339,759 | B2 * | 12/2012 | Weil .............................. | 361/118 |
| 8,390,404 | B2 * | 3/2013 | Zou ................................ | 335/6 |

(Continued)

*Primary Examiner* — Abdullah Riyami
*Assistant Examiner* — Vladimir Imas
(74) *Attorney, Agent, or Firm* — Raymond Y. Chan; David and Raymond Patent Firm

(57) ABSTRACT

A power supply connection structure device for electrically connecting an electrical appliance to a power source includes a live wire connection unit, a neutral wire connection unit and a control unit. The control unit is switched between an activation state and an idle state. When the control unit is in the idle state, the live wire and neutral wire connection units are not electrically connected to the power supply. When the control unit is in the activation state, the control unit electrically connects the live wire and neutral wire connection units to the power supply. Therefore, by means of the control unit, the power supply connection structure device is safe to use and waterproof and prevents individual from electric shock.

20 Claims, 21 Drawing Sheets

(56) References Cited

U.S. PATENT DOCUMENTS

| | | | |
|---|---|---|---|
| 8,491,332 B1 * | 7/2013 | Mo et al. ........................ | 439/568 |
| 8,749,340 B2 * | 6/2014 | Hsu et al. ........................ | 337/14 |
| 8,824,110 B2 * | 9/2014 | Zou ................................. | 361/42 |
| 2006/0061924 A1 * | 3/2006 | Zhang ............................ | 361/42 |
| 2009/0093160 A1 * | 4/2009 | Hsieh et al. ................ | 439/620.1 |

* cited by examiner

POWER SUPPLY CONNECTION STRUCTURE DEVICE

CROSS REFERENCE OF RELATED APPLICATION

This is a Continuation application that claims the benefit of priority under 35 U.S.C. §119 to a non-provisional application, application Ser. No. 14/239,147, filed on Feb. 16, 2014.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to a power supply connection structure device, and more particularly to a power supply connection structure device which is safe to use, waterproof, and prevents electric shock to an individual.

2. Description of Related Arts

A power supply connection structure device is generally electrically connected to a power supply so that an electrical appliance is supplied with electric power for working. A conventional power supply connection structure device can be a lamp socket, a three-hole power cord, or an electric socket. The lamp socket, which is a two-phase power connection device, generally includes two plug columns which are respectively electrically connected to the live wire and the neutral wire. The lamp socket is electrically connected to a lamp for supplying electric power to the lamp. The three-hole power cord, which is a three-phase power connection device generally having three plugholes for coupling with the live wire, neutral wire and the ground wire respectively, is electrically connected to an electrical appliance for providing power supply. The three-hole power cord is widely used with office equipments, such as computers and printers, household electrical appliances, such as rice cookers and electric water heaters. The two-hole and three-hole electric sockets are also common in our daily lives. However, there are still some potential safety hazards for the conventional power supply connection structure device, especially the problem of waterproof and electric shock to an individual. For example, a curious child may pull off a fluorescent tube of a household desk lamp from its socket and may touch the socket with his or her hands. As for a conventional power cord, they may hold conductive objects such as metal nails, and copper wires, and insert them into the plugholes. These behaviors are very dangerous that may result an electric shock to an individual. On the other hand, since the current power supply connection structure device has no waterproofing capability or feature, when water unintentionally gets into the power supply connection structure device such as a three-hole power cord, the device could be electrically connected to the power source, that is when a person is in contact with the device, an electric shock to the person is easy to take place. Therefore, a power supply device which is waterproof and prevents electric shock to an individual for ensuring its safe use is a common demand in the market.

SUMMARY OF THE PRESENT INVENTION

The main object of the present invention is to provide a power supply connection structure device which is waterproof, prevents electric shock to an individual, and is safe to use.

Another object of the present invention is to provide a power supply connection structure device, which comprises a first electrical connection unit, a second electrical connection unit, and a control unit, wherein when only the first electrical connection unit and the second electric connecting unit are connected to the power source, or either the first electrical connection unit or the second electrical connection unit is individually connected to the power source, the electric circuit between the device and the power source is not electrically connected. However, only when the control unit connects the first electrical connection unit and the second electrical connection unit to the power source, the electric circuit between the first and second electrical connection units and the power source is electrically connected, so that the power supply connection structure device can be used for power supply.

Another object of the present invention is to provide a power supply connection structure device, wherein the connection of the electric circuit is under control of the control unit. In other words, only when the first and second electrical connection units, and the control unit cooperate, the power supply connection structure device is able to connect to the power source, so that electric shock to an individual is prevented.

Another object of the present invention is to provide a power supply connection structure device, which is used for electrically connecting an electrical appliance to the power source, wherein the first and second electrical connection units can be the live wire connecting unit and the neutral wire connecting unit respectively while the control unit controls the electrical connection between the live wire connecting unit and the live wire of the power source, and the electrical connection between, the neutral wire connecting unit and the neutral wire of the power source, the live wire connecting unit and the neutral wire connecting unit, are not directly connected to the power source, so that the power supply connection structure device of the present invention can safely electrically connect the electrical appliance to the household or industrial AC power supply.

Another object of the present invention is to provide a power supply connection structure device, wherein the control unit comprises two micro-switches, when the control unit is activated, the two micro-switches connect the live wire connecting unit and the neutral wire connecting unit to the live wire and the neutral wire respectively, so that the power supply connection structure device is electrically connected to the power source. Therefore, by means of the two micro-switches, only when the control unit is activated, the power supply connection structure device is able to connect with the power source, so that the power supply connection structure device is safe to use.

Another object of the present invention is to provide a power supply connection structure device, which can be a three-hole power cord, wherein the first electric connection unit includes a live wire plughole and a live wire connection terminal and the second electric connection unit includes a neutral wire plughole and a neutral wire connection terminal. The three-hole power cord further has a ground wire plughole, so that the live wire plughole, the neutral wire plughole and the ground wire plughole are adapted for coupling with the live wire, the neutral wire and the ground wire respectively. The three-hole power cord further comprises an electric circuit arrangement which includes a live wire access terminal, a neutral wire access terminal, and a ground wire access terminal, wherein the control unit electrically connects the live wire connection terminal to the live wire access terminal, and electrically connects the neutral wire connection terminal to the neutral wire access terminal by the two micro-switches, so that, by introducing the control unit, the three-hole power cord is safe to use.

Another object of the present invention is to provide a power supply connection structure device, wherein the power supply connection structure device can be a three-hole power cord, wherein the control unit, which can be provided at the ground wire plughole, comprises an insulation push member and two actuation members. When the insulation push member is pressed, the two actuation members close the two micro-switches respectively, so that the live wire connection terminal is electrically connected to the live wire access terminal while the neutral wire connection terminal is electrically connected to the neutral wire access terminal. Therefore, when a conductive object is inserted and received in the live wire plughole or the neutral wire plughole, or when there are conductive objects inserting into both of the live wire plughole and the neutral wire plughole, or when there are conductive objects inserting into the ground wire plughole, the electric circuit will not be connected, so that the safe use of the three-hole power cord is ensured.

Another object of the present invention is to provide a power supply connection structure device, which can be a three-hole power cord, wherein the control unit may further comprise a waterproof seal provided at the insulation member and the inner walls around the live wire plughole and the neutral wire plughole are also waterproof. The three-hole power cord further comprises a partition arrangement, which has a central hole for receiving the waterproof seal and three communication holes for the live wire connection terminal, the neutral wire connection terminal and the ground wire connection terminal to sealedly pass therethrough respectively. Therefore, even when the live wire plughole, the neutral wire plughole and the ground wire plughole are all filled with water, the water will not pass through the partition arrangement to have contact with the electric circuit arrangement, so that the three-hole power cord is provided with a waterproof effect, and thus electric shock to an individual is prevented.

Another object of the present invention is to provide a power supply connection structure device, which can be a lamp socket for electrically connecting a lamp to a power source, wherein the first electric connection unit and the second electric connection unit can be respectively a live wire plug column and a neutral wire plug column. When one of the live wire plug column and the neutral wire plug column is pressed, or both of the live wire plug column and the neutral wire plug column are pressed, the electric circuit will not connect. The electric circuit will only connect when the control unit is activated, so that it is safe to use and electric shock to an individual is prevented.

Another object of the present invention is to provide a power supply connection structure device, which can be an electric socket for electrically connecting an electrical appliance to a power source, wherein the first electric connection unit and the second electric connection unit can be a live wire connection unit and a neutral connection unit respectively, and that when a conductive object is inserted and received in one of or both of the plugholes of the live wire connection unit and a neutral connection unit, the electric circuit will not be connected. The electric circuit will only connect when the control unit is activated, so that it is safe to use and electric shock to an individual is prevented.

Another object of the present invention is to provide a power supply connection structure device, which can be an electric socket, wherein the control unit, which is provided at the ground wire plughole, further provides a hook releasing mechanism, and that only when a plug pin of a standard plug is inserted and received in the ground wire plughole, the push member will be pushed to actuate the micro-switches, so that the operation safety will further be ensured.

Another object of the present invention is to provide a power supply connection structure device, wherein the structure is simple, the manufacturing cost is low, and it is suitable for mass production.

Additional advantages and features of the invention will become apparent from the description which follows, and may be realized by means of the instrumentalities and combinations particular point out in the appended claims.

According to the present invention, the foregoing and other objects and advantages are attained by a power supply connection structure device for electrically connecting an electrical appliance to a power source, comprising a first electric connection unit, a second electric connection unit, and a control unit which shifts between an idle state, in which the first and second electric connection units are not connected to the power source, and an activation state, in which the control unit electrically connect the first and second control units to the power source, so as to electrically connect the power supply connection structure device, the power source and the electrical appliance to form an electric circuit, thereby the power source provide a power supply to the electrical appliance.

Preferably, the first electric connection unit is a live wire connection unit while the second electric connection unit is a neutral wire connection unit.

Preferably, the power supply connection structure device further comprises an electric circuit arrangement which includes a live wire access terminal and a neural wire access terminal. The control unit comprises two micro-switches, wherein when the control unit is in the activation state, one of the two micro-switches electrically connects the live wire connection unit with the live wire access terminal, and the other micro-switch electrically connects the neutral wire connection unit with the neutral wire access terminal, thereby the power supply connection structure device, the electrical appliance and the power source are electrically connected to form an electric circuit.

Preferably, the power supply connection structure device is embodied as a three-hole power cord, wherein the first electric connection unit is a live wire connection unit having a live wire plughole and including a live wire connection terminal, and the second electric connection unit is a neutral wire connection unit having a neutral wire plughole and including a neutral wire connection terminal. The power supply connection structure device further comprises a ground wire connection unit which has a ground wire plughole and includes a ground wire connection terminal, wherein when three plug pins of the electrical appliance are respectively inserted and received in the live wire plughole, the neutral wire plughole and the ground wire plughole, the three plug pins of the electrical appliance are electrically connected to the live wire connection terminal, the neutral wire connection terminal and the ground wire connection terminal respectively.

Preferably, the power supply connection structure device is embodied as a lamp socket, wherein the electrical appliance is a lighting lamp and the first electric connection unit is a live wire plug column while the second electric connection unit is a neutral wire plug column.

Preferably, the power supply connection structure device is embodied as a socket, wherein the first electric connection unit is a live wire connection unit having a live wire plughole and including a live wire connection terminal, and the second electric connection unit is a neutral wire connection unit having a neutral wire plughole and including a neutral wire connection terminal. The power supply connection structure device further comprises a ground wire connection unit which has a ground wire plughole and includes a ground wire connection terminal, wherein when three plug pins of the electrical appliance are respectively inserted and received in the live wire plughole, the neutral wire plughole and the ground wire plughole, the three plug pins of the electrical appliance are electrically connected to the live wire connection terminal, the neutral wire connection terminal and the ground wire connection terminal respectively.

Preferably, the control unit is coupled with the ground wire connection unit.

Preferably, the control unit comprises a push member and two actuation members, wherein the two actuation members are parallelly and spacedly coupled to the push member. The two micro-switches are respectively coupled to the two actuation members in such a manner that when the two actuation members are driven by the push member to move, the two micro-switches are respectively driven by the two actuation members to switch on. Thereby, the electric circuits between the live and neutral wire connection terminals, and the live and neutral wire access terminals are respectively connected.

Preferably, the control unit further comprises a reposition arrangement, wherein the two actuation members return to their original positions by means of the reposition arrangement, so that the two micro-switches are respectively driven to switch off by the two actuation members.

Preferably, the reposition arrangement comprises two springs each having a first end coupled to one of the activation members and a second end coupled to the electric circuit arrangement.

Preferably, each of the activation members comprises an actuation arm and a drive arm extended from the actuation arm, wherein the actuation arm is driven by the push member and the reposition arrangement to reciprocate. Each of the micro-switches comprises a resilient element and an electric connection element which is an electric conductive element. Each of the micro-switches operates as a switch for electrically connecting the electric circuits between the live and neutral wire connection terminals, and the live and neutral wire access terminals respectively. When the push member is pressed, the actuation arm is pressed by the push member to drive the drive arm to bias against the resilient element, wherein the resilient element forces the electric connection element to move, so as to allow the electric connection elements to electrically connect the electric circuits between the live and neutral wire connection terminals, and the live and neutral wire access terminals respectively.

Preferably, the control unit further comprises a retention pivot and a retention element pivotally and rotatably coupled to the retention pivot in such a manner that an opening is formed between the retention element and the push member. The retention element is detachably mounted to the push member, wherein when a plug pin is inserted into the opening, the push member is detached from the retention element, so as to drive the activation members to switch on the micro-switches.

Preferably, the width of the opening is substantially the same as the width of a plug pin of a plug of the electrical appliance.

Preferably, the retention element comprises a retainer arm and an actuator arm extended from the retainer arm, wherein the actuator arm is detachably coupled with the push member.

Preferably, the actuator arm provides a groove and the push member provides a hook adapted for detachably engaging with the groove in such manner that the actuator arm is detachably coupled with the push member.

Preferably, the power supply connection structure device comprises a housing defining a receiving cavity for receiving the control unit and the electric circuit arrangement. The housing comprises a partition arrangement, wherein the live wire plug hole, the neutral wire plughole and the ground wire plughole are formed at a first side of the partition arrangement, and that the electric circuit arrangement is provided at an opposed second side of the partition arrangement. The partition arrangement has a central hole which couples with the control unit, and three communication holes for the live wire connection terminal, the neutral wire connection terminal and the ground wire connection terminal to pass therethrough respectively and to enable the live wire connection terminal, the neutral wire connection terminal and the ground wire connection terminal to be sealedly formed with the partition arrangement.

Preferably, the control unit further comprises a seal provided in the ground wire plughole, wherein the seal is provided with a positioning member for mounting the push member, wherein a receiving compartment is formed between the seal and the positioning member. The push member comprises a push arm and a retention arm extended from the push arm and the positioning member comprises a pad body having a positioning hole, wherein the retention arm is capable of inserting into the receiving compartment through the positioning hole.

Preferably, the seal, the positioning member and the push member are made of waterproof silicon dioxide.

Preferably, the control unit comprises an activation arm and a stopper arm. The push member is formed with a slot, wherein a first end of the stopper arm is detachably engaged in the slot and a second end of the stopper arm is connected to the activation arm in such a manner that the stopper arm is driven by the activation arm to displace, wherein when coupling with the lighting lamp, the activation arm is pressed to drive the stopper arm to move, so as to detach from the push member, so that the push member applies an pressing force to the activation members to switch on the micro-switches.

Preferably, each of the micro-switches is a metal resilient plate, wherein the control unit comprises a push member and the micro-switches are coupled to the push member in such a manner that the micro-switches switch on in response to a driving operation of the push member so as to electrically connect the electric circuit between the live wire connection unit and the live wire access terminal, and the electric circuit between the neutral wire connection unit and the neutral wire access terminal respectively.

According to another aspect of the present invention, the present invention provides a method of manufacturing a power supply connection structure device which comprises the following steps.

(a) Provide a housing having a live wire plughole, a neutral wire plughole and a ground wire plughole thereon and defining a receiving cavity therein.

(b) Couple a live wire connecting terminal, a neutral wire connecting terminal and a ground wire connecting terminal with the live wire plughole, the neutral wire plughole and the ground wire plughole respectively, and dispose an electric circuit arrangement in the receiving cavity, wherein the electric circuit arrangement comprises a live wire access terminal and a neutral wire access terminal.

(c) Configure a control unit comprising two micro-switches, wherein when the two micro-switches switch on, one of the two micro-switches electrically connects the live wire connection terminal with the live wire access terminal and the other micro-switch electrical connects the neutral wire connection terminal with the neutral wire access terminal, so that an electric circuit between the power supply connection structure device, a power source and an electrical appliance is connected.

According to another aspect of the present invention, the present invention provides a method for electrically connecting an electrical appliance to a power source via a power source connection structure device, wherein the method comprises the following steps.

(i) Receive three plug pins of the electrical appliance in a live wire plughole, a neutral wire plughole and a ground wire plughole respectively for electrically connecting the three plug pins to a live wire connecting terminal, a neutral wire connecting terminal and a ground wire connecting terminal respectively.

(ii) Drive two actuation members to switch on two micro-switches when one of the three plug pins pushes a push member of a control unit, so as to electrically connect the live wire connection terminal with the live access terminal and to electrically connect the neutral wire connection terminal with the neutral wire access terminal respectively, so that an electric circuit between the power supply connection structure device, the power source, and the electrical appliance is connected.

The present invention is advantageous in that the two electric connection units are not directly connected to the power source, but is under control of the control unit, so that when both of the two electric connection units and the control unit are in operation, the electric circuit can be connected, and thus electric shock to an individual is prevented. In addition, the introduction of the partition arrangement and the waterproof seal of the control unit enable a waterproof effect of the power supply connection structure device of the present invention.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
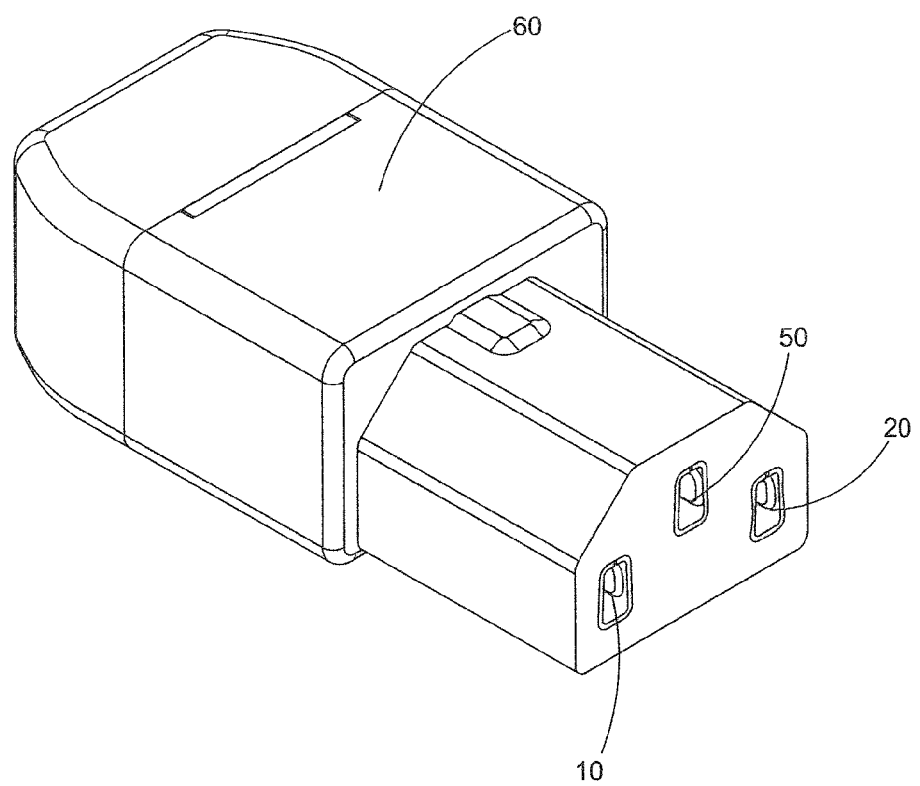
FIG. 1 is a perspective view of a power supply connection structure device according to a first preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1 to 7 of the drawings, a power supply connection structure device, which is used for electrically connecting an electrical appliance to a power source, according to a first preferred embodiment of the present invention is illustrated. The power supply connection structure device comprises a first electric connection unit 10, a second electric connection unit 20 and a control unit 30. When the control unit 30 is in an activation state, the control unit 30 electrically connects the first and second electric connection units 10 and 20 to the power source, so that an electric circuit between the power supply connection structure device, the electrical appliance and the power source is connected, and thus the power source can supply electric power to the electrical appliance.

The first and second electric connection units 10 and 20 are arranged for electrically connecting to the power source for forming the electric circuit. The power source may be a DC electric power source, so that the first and second electric connection units 10 and 20 are respectively arranged for electrically connecting to the positive and negative electrodes of the DC electric power source. According to this preferred embodiment of the present invention, the power source is an AC electric power source, and the first and second electric connection units 10 and 20 are respectively a live wire connection unit and a neutral wire connection unit.

The power supply connection structure device further comprises an electric circuit arrangement 40 which may be embodied as an electric circuit board and includes a live wire access terminal 41 and a neutral wire access terminal 42. The control unit controls two micro-switches 31. When the control unit 30 is in the activation state, the two micro-switches 31 electrically connect the live wire connection unit 10 with the live wire access terminal 41, and the neutral wire connection unit 20 with the neutral wire access terminal 42 respectively, so that the power supply connection structure device, the electrical appliance and the power source are electrically connected with each other to form an electric circuit.

More specifically, the power supply connection structure device of this preferred embodiment of the present invention can be, but not limited to, a three-hole power cord which is widely used with office equipments, such as computers, and printers, and household electrical appliances, such as rice cookers and electric water heaters. The first electric connection unit 10 is a live wire connection unit having a live wire plughole 11 and including a live wire connection terminal 12 electrically connected to the live wire plughole 11. The second electric connection unit 20 is a neutral wire connection unit having a neutral wire plughole 21 and including a neutral wire connection terminal 22 electrically connected to the neutral wire plughole 21. Accordingly, the three-hole power cord, which is a three-phase electric power cord, further comprises a ground wire connection unit 50 which has a ground wire plughole 51 and includes a ground wire connection terminal 52 electrically connected to the ground wire plughole 51. Thus, when three plug pins of an electrical appliance are respectively inserted and received in the live wire plughole 11, the neutral wire plughole 21 and the ground wire plughole 51, the plug pins of the electrical appliance are respectively electrically connected to the live wire connection terminal 12, the neutral wire connection terminal 22 and the ground wire connection terminal 52.

According to this preferred embodiment, the power supply connection structure device can be embodied as the three-hole power cord, wherein when the control unit is in the activation state, the control unit 30 electrically connects the live wire connection unit 10 and the neutral wire connection unit 20 to the power source, so that the electric circuit between the power supply connection structure device, the electrical appliance and the power source is connected, and thus the power source can supply electric power to the electrical appliance.

Accordingly, the three-hole power cord also comprises the electric circuit arrangement 40 which includes the live wire access terminal 41 and the neutral wire access terminal 42. The control unit 30 controls the two micro-switches 31. When the control unit 30 is in the activation state, one of the two micro-switches 31 electrically connect the live wire connection unit 10 with the live wire access terminal 41, and the other micro-switch 31 electrically connects the neutral wire connection unit 20 with the neutral wire access terminal 42, so that the electric circuit between the power supply connection structure device, the electrically appliance and the power source is in electrical connection state.

Figure 4:
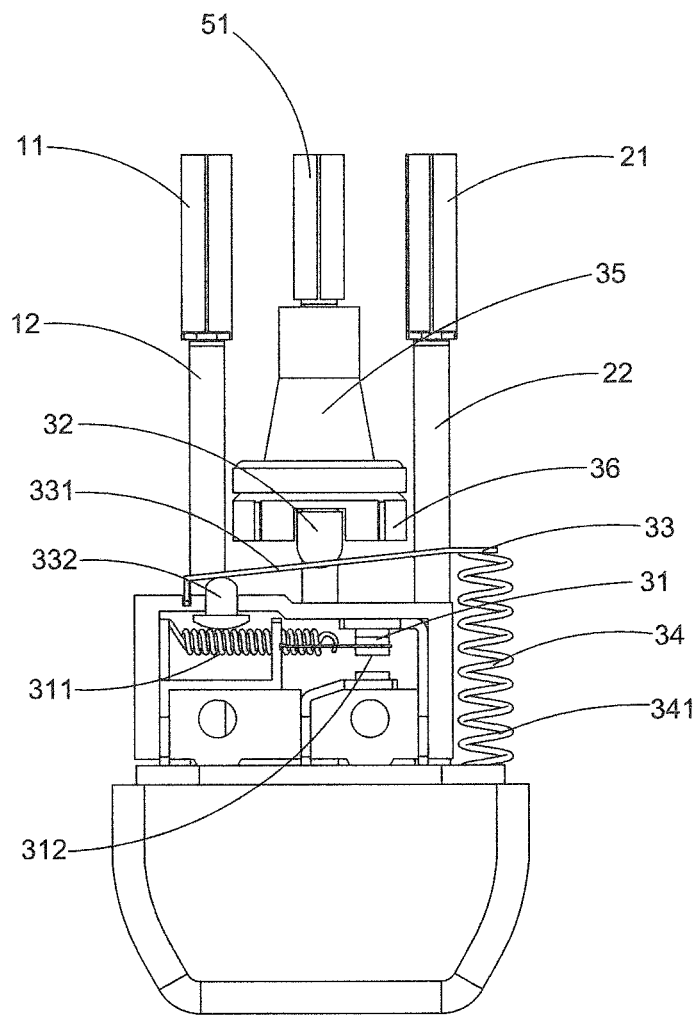
FIG. 4 is a schematic view illustrating the power supply connection structure device in an idle state according to the above first preferred embodiment of the present invention.
Figure 5:
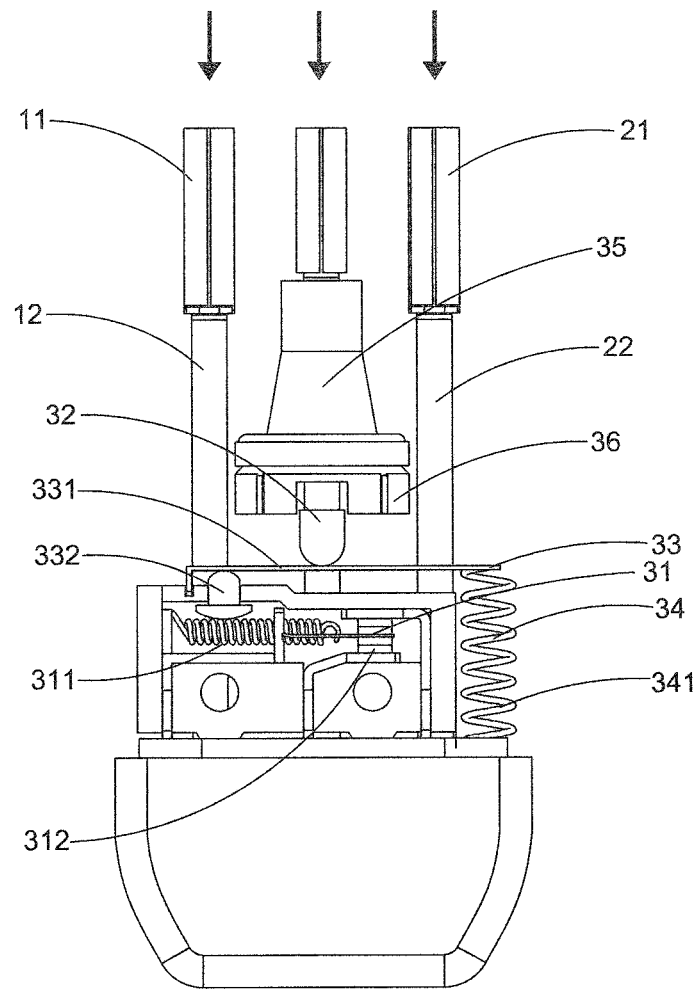
FIG. 5 is a schematic view illustrating the power supply connection structure device in an activation state according to the above first preferred embodiment of the present invention.

More specifically, as shown in FIGS. 4 and 5 of the drawings, when the control unit 30 is an idle state, even though the plug pins are inserted and received in the live wire plughole 11 and the neutral wire plughole 21 respectively and the plug pins are electrically connected to the live wire connection terminal 12 and the neutral wire connection terminal 22 respectively, as long as the live wire connection terminal 12 and the neutral wire connection terminal 22 are not electrically connected to the live wire access terminal 41 and the neutral wire access terminal 42 of the electric circuit arrangement 40 respectively, the electric circuit thereof is not electrically connected.

When the control unit 30 is in the activation state, the live wire connection terminal 12 and the neutral wire connection terminal 22 are electrically connected with the plug pins, and the control unit 30 is arranged to electrically switch on the two micro-switches 31 provided respectively between the live and neutral wire connection terminals 12 and 22 and between the live and neutral wire access terminals 41 and 42 of the electric circuit arrangement 40, so that the electric circuit between the power supply connection structure device and the electrical appliance is electrically connected. When the power source is electrically connected to the power supply connection structure device, the electrical appliance is supplied with electrical power for operation.

Figure 2:
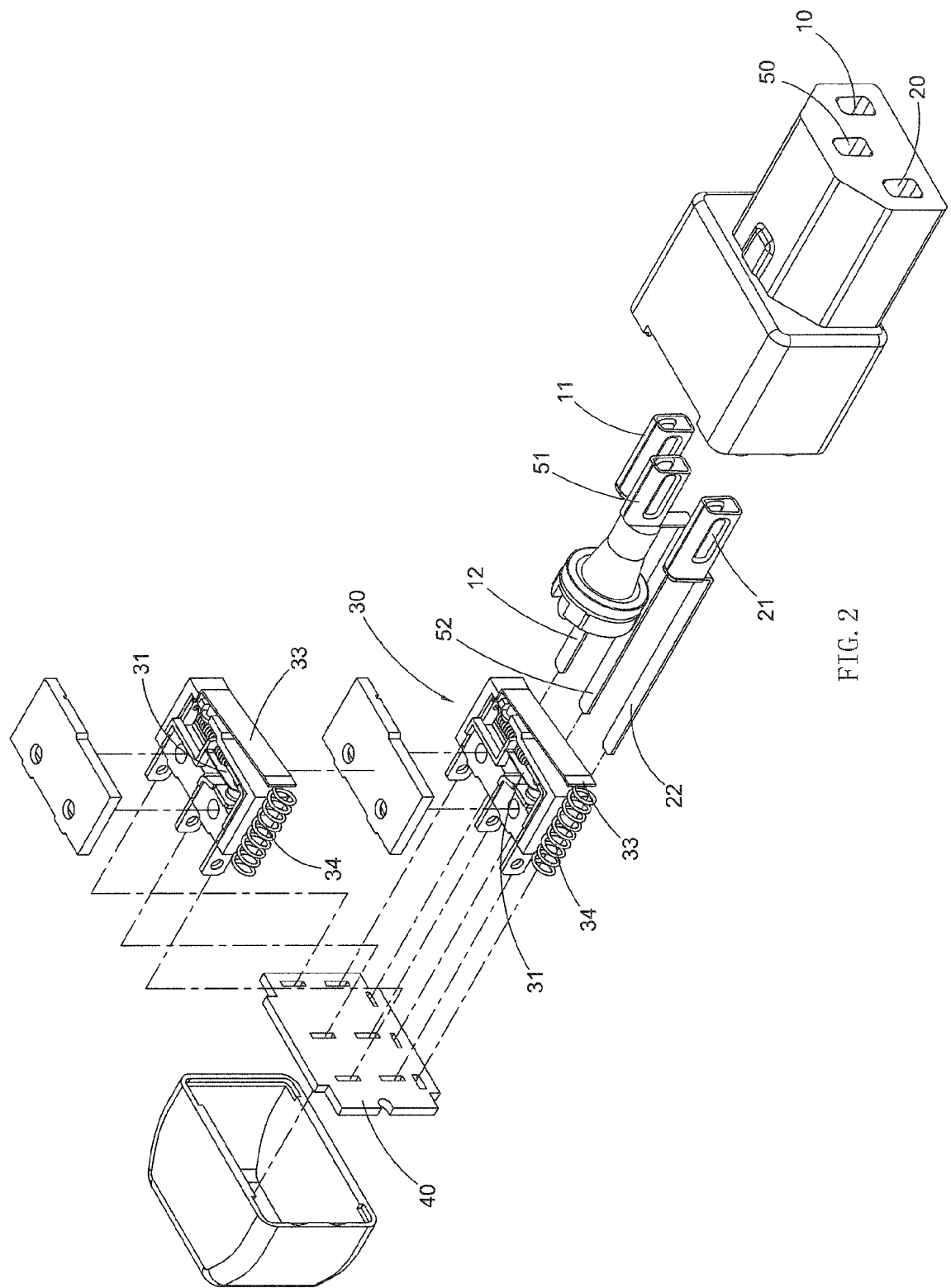
FIG. 2 is an exploded view of the power supply connection structure device according to the above first preferred embodiment of the present invention.

It is worth mentioning that the mechanism for the control unit 30 to switch on or switch off the two micro-switches can be embodied in various ways. According to this preferred embodiment of the present invention, as shown in FIG. 2 of the drawings, the control unit 30, which is coupled to the ground wire connection unit 50, comprises a push member 32 and two actuation members 33 which are capable of providing reciprocating movement. The two actuation members 33 are parallelly and spacedly coupled to the push member 32. The two micro-switches 31 are respectively coupled to the two actuation members 33, so that when the two actuation members 33 are driven by said push member 32 to move, the two micro-switches 31 are respectively driven by the two actuation members 33 to switch on, so that the live and neutral wire connection terminals 12 and 22, and the live and neutral wire access terminals 41 and 42 are electrically connected. It is worth mentioning that the push member 32 can be embodied as a push shaft in this preferred embodiment.

It is worth mentioning that the control unit 30 further comprises a reposition arrangement 34. The two actuation members 33 return to their original positions by means of the reposition arrangement 34, so that the two micro-switches 31 are respectively driven to the switch off state by the two actuation members 33.

More specifically, the reposition arrangement 34 is embodied as a resilient arrangement comprising two springs 341. A first end of each spring 341 is connected to an actuation member 33 and a second end thereof can be connected to the electric circuit arrangement 40 or the housing. Therefore, when a plug pin of the electrical appliance, which is a ground wire connection plug pin in this preferred embodiment, is inserted and received in the ground wire plughole 51, the push member 32 presses the two actuation members 33 and the two springs are compressed, so that the two micro-switches are switched on to electrically connect the live wire connection terminal 12 with the live wire access terminal 41 and to electrically connect the neutral wire connection terminal 22 with the neutral wire access terminal respectively. When the plug pin of the electrical appliance is removed from the ground wire plughole 51, the push member 32 is released, and the two springs 341 restore to their original positions respectively, so that the two actuation members 33 are driven to return to their original positions respectively, and then the two micro-switches 31 are in the switch off state, wherein the live wire connection terminal 12 is electrically disconnected with the live neutral wire access terminal 41 and the neutral wire connection terminal 22 is also electrically disconnected with the neutral wire access terminal 42.

In other words, the merely electrical connection between the plug pins of the electrical appliance and the live and neutral wire connection terminals 12 and 22 is not able to switch, i.e. to electrically connect, the electric circuit between the electrical appliance and the power supply connection structure device of the present invention. Only when the control unit 30, which is coupled to the ground wire connection unit 50, is activated to switch on the two micro-switches, the electric circuit between the electrical appliance and the power supply connection structure device of the present invention is switched and electrically connected. It is worth mentioning that the push member 32 and the actuation members 33 are preferred to be made of insulation materials.

Referring to FIGS. 4 and 5 of the drawings, more specifically, each of the actuation members 33 comprises an actuation arm 331 and a drive arm 332 extended from the actuation arm 331. The actuation arm 331 is driven by the push member 32 and the reposition arrangement 34 to reciprocate. Each of the micro-switches 31 may comprise a resilient element 311 which can be a spring and an electric connection element 312 which can be an electric conductive element. One of the micro-switches 31 operates as a switch to electrically connect the live wire connection terminal 12 with the live wire access terminal 41 and the other micro-switch 31 also operates as a switch to electrically connect the neutral wire connection terminal 22 with the live and neutral wire access terminal 42.

In other words, when the push member 32 is pressed, the actuation arms 331 are driven by the push member 32 to drive the drive arms 332 to respectively press the resilient elements 311, and then the resilient elements 311 respectively drive the electric connection elements 312 to move, so as to electrically connect the live wire connection terminal 12 with the live wire access terminal 41 and to electrically connect the neutral wire connection terminal 22 with the neutral wire access terminal 42 respectively.

Figure 3:
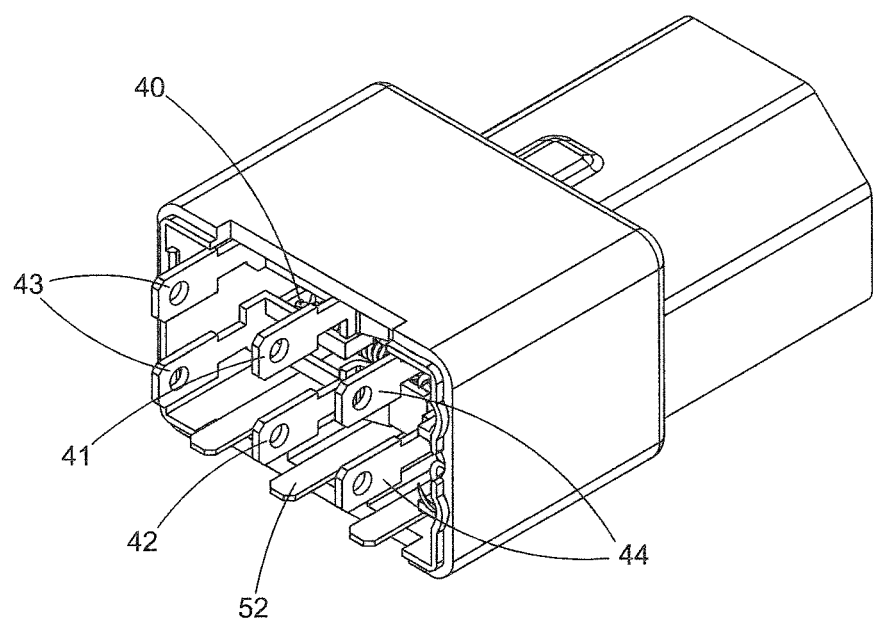
FIG. 3 is a rear view of the power supply connection structure device according to the above first preferred embodiment of the present invention.

Referring to FIG. 3 of the drawings, the electric circuit arrangement 40 further comprises a first electric connection arrangement 43 which is electrically coupled to the live and neutral wire connection terminals 12 and 22 and is electrically connected to a first indication lamp. When the three-hole power cord is electrically connected to the power source and the electrically appliance, and the plug pins of the electrical appliance are respectively inserted and received in the live and neutral wire plugholes 11 and 21, the first indication lamp will illuminate when the first electric connection arrangement 43 is electrically connected without the operation of the control unit 30. The electric circuit arrangement 40 further comprises a second electric connection arrangement 44 which is coupled to the live and neutral wire access terminal 41 and 42 of the electric circuit arrangement 40, and a second indication lamp is electrically connected to the second electric connection arrangement 44, so that when the control unit 30 is operated to switch on the micro-switches 31, the second indication lamp will illuminate when the second connection arrangement 44 is electrically connected with the power source.

For example, the first indication lamp can be a green signal lamp while the second indication lamp can be a red signal lamp. When there are electric conductive objects inserting into the live and neutral wire plugholes 11 and 21, the green signal lamp will provide a green light illumination, but the electric circuit between the device and the power source is not connected, so that electric shock to an individual is prevented. When the live and neutral wire plugholes 11 and 21 receive inserting electric conductive objects and simultaneously that there is a rigid object pushing the push member 32 for switching on the two micro-switches 31, the electric circuit between the device and the power source will be electrically connected and the red signal lamp will provide a red light illumination.

In other words, in comparison with the conventional three-hole power cord, the three-hole power cord of the present invention is provided with an additional control unit 30. Only under the operation of the control unit 30, the three-hole power cord can electrically connect to the live and neutral wires, so that the electric circuit between the power source, the three-hole power cord, and the electrical appliance can be electrically connected, and thus the electrical appliance is able to be provided with power supply. Because of the arrangement of the control unit 30, when a child inserts electric conductive objects into the live and neutral wire plugholes 11 and 21, the electric circuit will not be connected, so that electric shock to any individual is prevented. In addition, the control unit 30 is coupled to the ground wire connection unit, providing a compact and integral structure.

Figure 6:
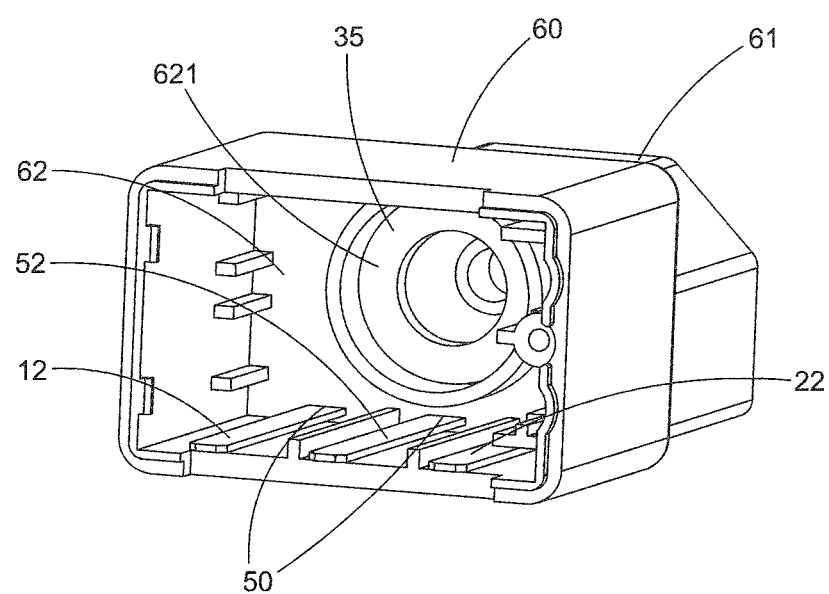
FIG. 6 is a schematic view illustrating the partition arrangement of the power supply connection structure device according to the above first preferred embodiment of the present invention.

It is worth mentioning that the power supply connection structure device is provided with a waterproof ability. Referring to FIG. 6 of the drawings, the power supply connection structure device, i.e. the three-hole power cord, comprises a housing 60 defining a receiving cavity 61 for receiving the control unit 30 and the electric circuit arrangement 40.

The housing 60 comprises a partition arrangement 62, wherein the live wire plughole 11, the neutral wire plughole 21, and the ground wire plughole 51 are formed at a first side of the partition arrangement 62, while the electric circuit arrangement 40 is provided at a second side of the partition arrangement 62 opposing to the first side thereof. The partition arrangement 62 has a central hole 621 for coupling with the control unit 31, and three communication holes 622 for the live wire connection terminal 12, the neutral wire connection terminal 22, and the ground wire connection terminal 52 to sealedly pass therethrough.

Figure 7:
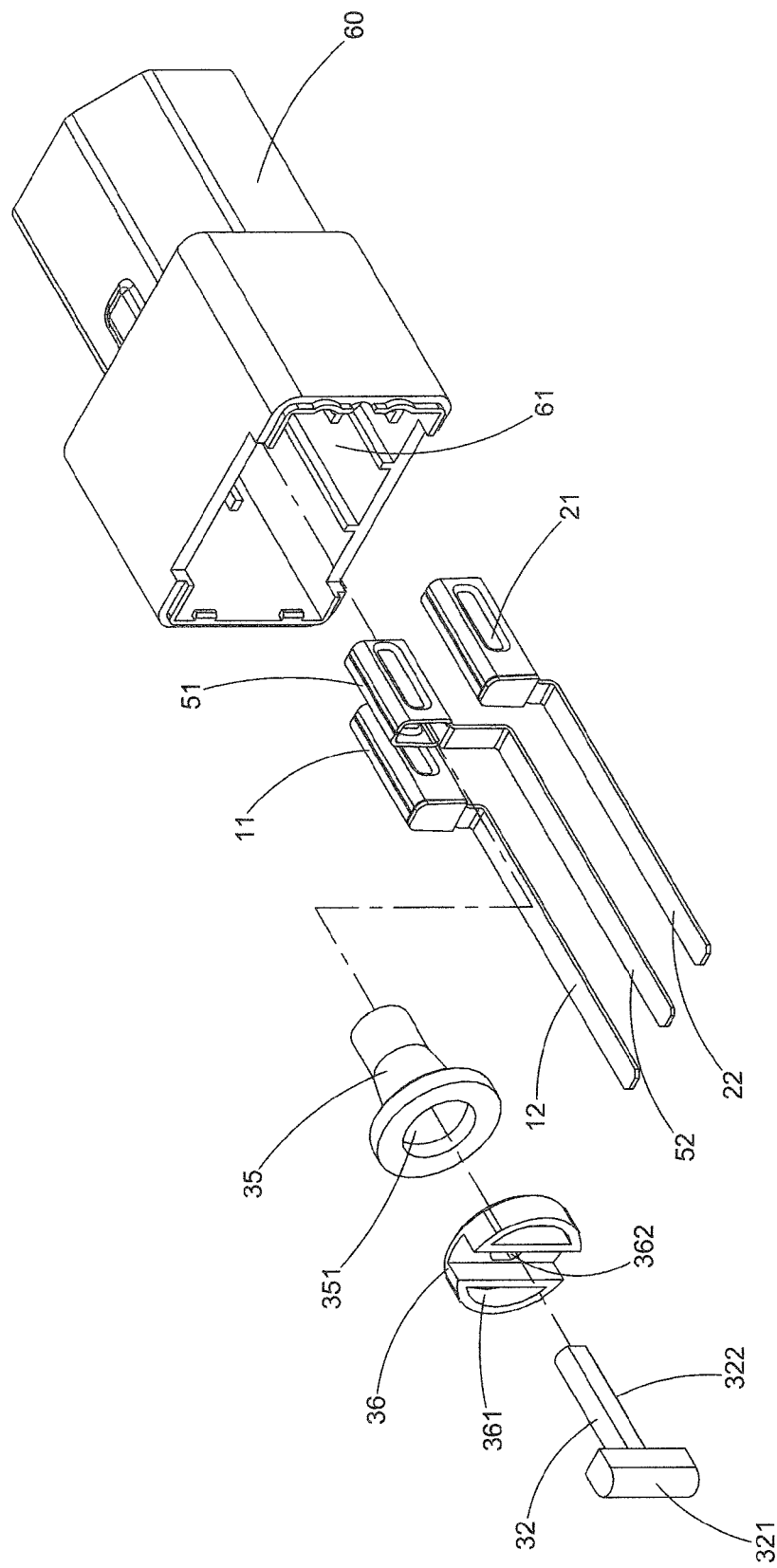
FIG. 7 an exploded view illustrating the control unit of the power supply connection structure device according to the above first preferred embodiment of the present invention.

Referring to FIG. 7 of the drawings, the control unit 30 further comprises a seal 35 provided in the ground wire plughole 51. Preferably, the seal 35 is made of waterproof silicon dioxide. The seal 35 can be connected to a positioning member 36 for mounting the push member 32. A receiving compartment 351 is formed between the seal 35 and the positioning member 36.

More specifically, the push member 32 comprises a push arm 311 and a retention arm 322 extended from the push arm 311. The positioning member 36 can be a positioning pad comprising a pad body 361 having a positioning hole 362, and the retention arm 322 can be inserted into the receiving compartment 351 through the positioning hole 362. When a plug pin of the electrical appliance is inserted and received in the ground wire plughole 51, the plug pin presses the retention arm 322 to move inwardly, so that the push arm 321 applies a pushing force to the two actuation members 33 so as to respectively switch on the two micro-switches 31.

Since the end portion of the seal 35 adjacent to the ground wire plughole is sealed, even though the three-hole power cord is immersed in water, water will not pass through the central hole 621 of the partition arrangement 62 and reach the opposing side adjacent to the electric circuit arrangement 40. In addition, the inner walls around the live wire plughole 11, the neutral wire plughole 21 and the ground wire plughole 51 are all formed with waterproof materials such as plastic materials. The live wire connecting terminal 12, the neutral wire connecting terminal 22 and the ground wire connecting terminal 52 pass through the communicating holes respectively and are sealedly coupled with the partition arrangement 62, and thus when the live wire plughole 11, the neutral wire plughole 21 and the ground wire plughole 51 are all filled with water, the water will not pass through the partition arrangement 62 and have contact with the electric circuit arrangement 40, so that the three-hole power cord is provided with a waterproof effect, and thus electric shock to any individual is prevented.

Accordingly, a manufacturing method of the power supply connection structure device of the present invention, adapted for electrically connecting the electrical appliance to the power source, and embodied as the three-hole power cord, comprises the following steps.

(a) Provide a housing 60 having a live wire plughole 11, a neutral wire plughole 21 and a ground wire plughole 51 thereon and defining a receiving cavity 61 therein.

(b) Couple a live wire connecting terminal 12, a neutral wire connecting terminal 22 and a ground wire connecting terminal 52 with the live wire plughole 11, the neutral wire plughole 21 and the ground wire plughole 51 respectively, and dispose an electric circuit arrangement 40 in the receiving cavity 61, wherein the electric circuit arrangement 40 comprises a live wire access terminal 41 and a neutral wire access terminal 42.

(c) Configure a control unit 30 comprising two micro-switches 31, wherein when the two micro-switches 31 are switched on, one of the two micro-switches 31 electrically connects the live wire connection terminal 12 with the live neutral wire access terminal 41 and the other micro-switch 31 electrical connects the neutral wire access terminal 22 with the neutral wire access terminal, so that the electric circuit between the power supply connection structure device, the power source, and the electrical appliance is electrically connected.

In the step (c), the control unit 30, which is coupled to the ground wire connection unit 50, comprises a push member 32 and two actuation members 33 which are capable of moving reciprocatingly. The two actuation members 33 are parallelly and spacedly coupled to the push member 32. The two micro-switches 31 are respectively coupled to the two actuation members 33, so that when the two actuation members 33 are driven by said push member 32 to move, the two micro-switches 31 are respectively driven by the two actuation members 33 to switch on. The control unit 30 further comprises a reposition arrangement 34. The two actuation members 33 return to their original positions by means of the reposition arrangement 34, so that the two micro-switches 31 are respectively driven to switch off by the two actuation members 33.

More specifically, the reposition arrangement 34 is a resilient arrangement comprising two springs 341. A first end of each spring 341 is connected to an actuation member 33 and a second end thereof can be connected to the electric circuit arrangement 40 or the housing. Therefore, when the push member 32 presses the two actuation members 33, the two springs are compressed, so that the two micro-switches are switched on to electrically connect the live wire connection terminal 12 with the live wire access terminal 41 and to electrically connect the neutral wire connection terminals 22 with the neutral wire access terminals 42 respectively.

In the step (c), the control unit 30 further comprises a seal 35 provided in the ground wire plughole 51. Preferably, the seal 35 is made of waterproof silicon dioxide. The seal 35 can be connected to a positioning member 36 for mounting the push member 32. A receiving compartment 351 may be formed between the seal 35 and the positioning member 36. The push member 32 comprises a push arm 311 and a retention arm 322 extended from the push arm 311. The positioning member 36 can be a positioning pad comprising a pad body 361 having a positioning hole 362, and the retention arm 322 can be inserted and received in the receiving compartment 351 through the positioning hole 362. When a plug pin of the electrical appliance is inserted and received in the ground wire plughole 51, the plug pin press the retention arm 322 to move inwardly, so that the push arm 321 applies a pushing force to the two actuation members 33 so as to switch on the two micro-switches 31.

Therefore, when the power supply connection structure device of the present invention is embodied as the three-hole power cord, a method for electrically connecting an electrical appliance to a power source is provided, wherein the method comprises the following steps.

(i) Receive three plug pins of the electrical appliance in the live wire plughole 11, the neutral wire plughole 21 and the ground wire plughole 51 respectively for electrically connecting the three plug pins to the live wire connecting terminal 12, the neutral wire connecting terminal 22 and the ground wire connecting terminal 52 respectively.

(ii) Drive two actuation members 33 to switch on the two micro-switches 31 when one of the three plug pins pushes the push member 32 of the control unit 30, so as to electrically connect the live wire connection terminal 12 with the live wire access terminal 41 and to electrically connect the neutral wire connection terminal 22 with the neutral wire access terminal 42 respectively, so that the electric circuit between the power supply connection structure device, the power source, and the electrical appliance is connected.

When the three plug pins of the electrical appliance get out of the live wire plughole 11, the neutral wire plughole 21, and the ground wire plughole 51 respectively, the push member 32 will return to its original position under the control of the reposition arrangement 34.

Figure 8:
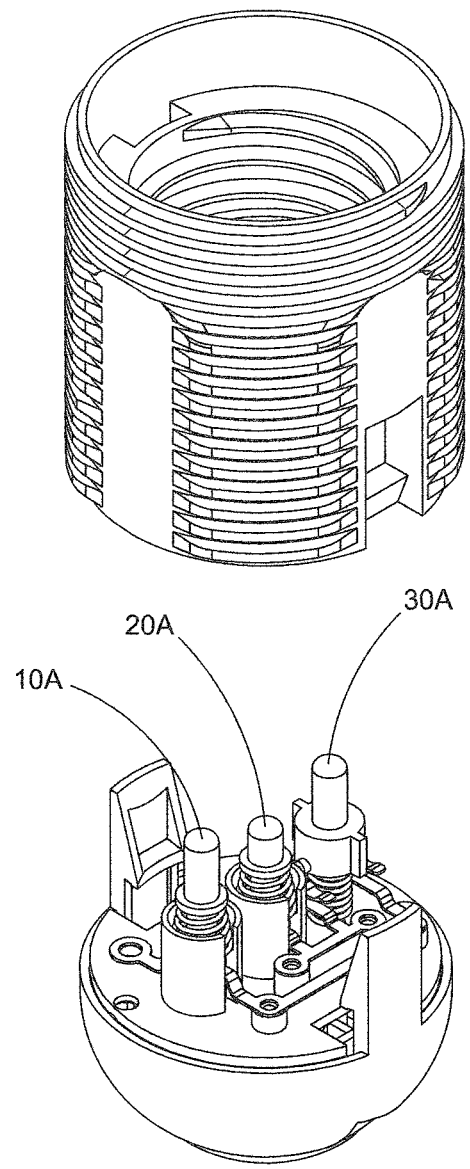
FIG. 8 is a perspective view of a power supply connection structure device according to a second preferred embodiment of the present invention.
Figure 9:
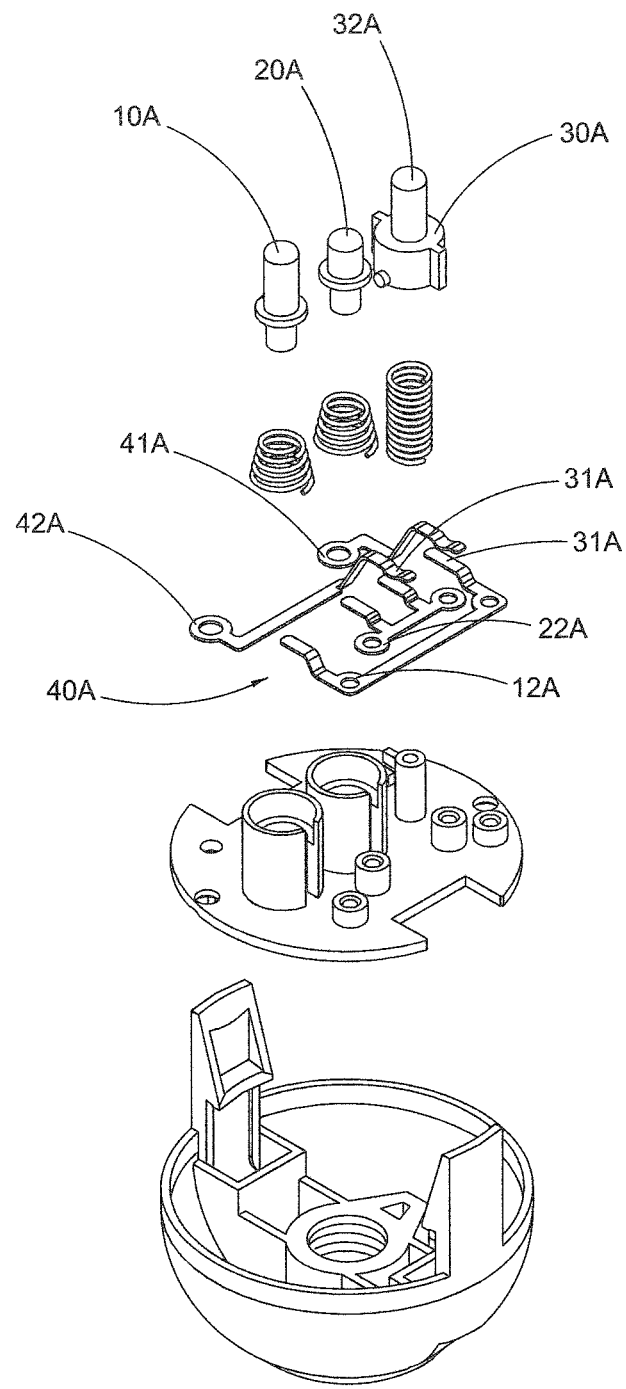
FIG. 9 is an exploded view of the power supply connection structure device according to the above second preferred embodiment of the present invention.
Figure 10:
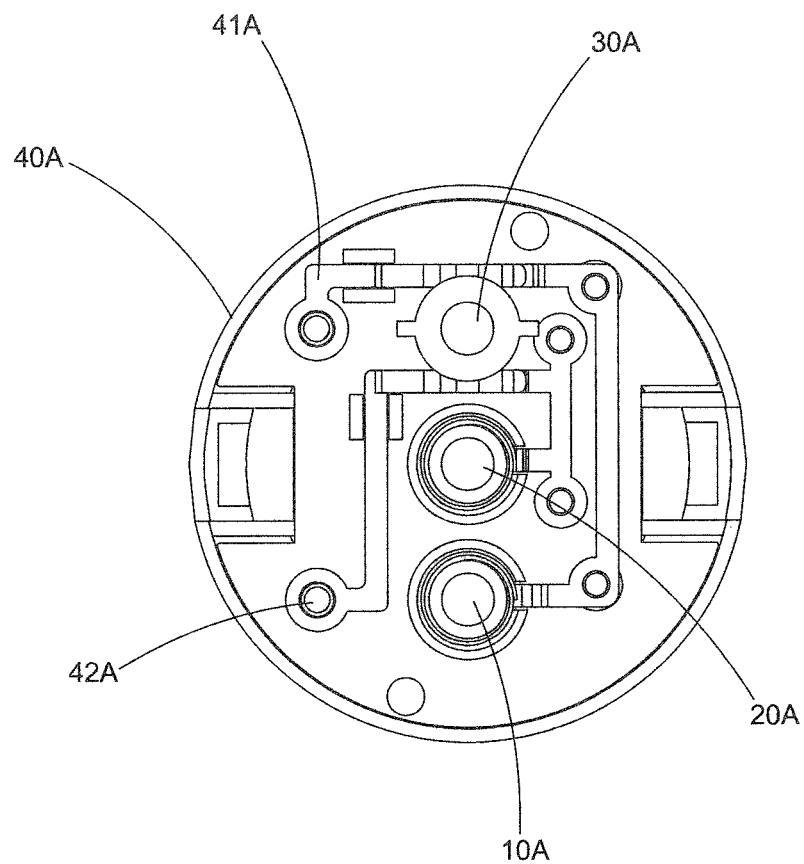
FIG. 10 is a schematic view illustrating the power supply connection structure device in an activation state according to the above second preferred embodiment of the present invention.

Referring to FIGS. 8 to 10 of the drawings, the power supply connection structure device according to a second preferred embodiment of the present invention embodied as a lamp socket, which is a two-phase power supply connection structure device for electrically connecting a lighting lamp to a power source which can be an AC electric power source, is illustrated. The power supply connection structure device of the second preferred embodiment comprises a first electric connection unit 10A, a second electric connection unit 20A and a control unit 30A. When the control unit 30A is in an activation state, the control unit 30A electrically connects the first and second electric connection units 10A and 20A to the power source, so that the electric circuit between the power supply connection structure device, the lighting lamp and the power source is connected, and thus the power source supplies electric power to the lighting lamp.

Referring to FIG. 9 of the drawings, the first and second electric connection units 10A and 20A are respectively a live wire plug column and a neutral wire plug column which are pressed to electrically connect to a live wire connection terminal 12A and a neutral connection terminal 22A respectively. The power supply connection structure device further comprises an electric circuit arrangement 40A including a live wire access terminal 41A and a neutral wire access terminal 42A. The control unit 30A controls two micro-switches 32A. When the control unit 30A is in the activation state, the two micro-switches 32A electrically connect the live wire connection unit 10A with the live wire access terminal 41A, and electrically connect the neutral wire connection unit 20A with the neutral wire access terminal 42A, so that the electric circuit between the power supply connection structure device, the lighting lamp and the power source is connected.

Figure 11:
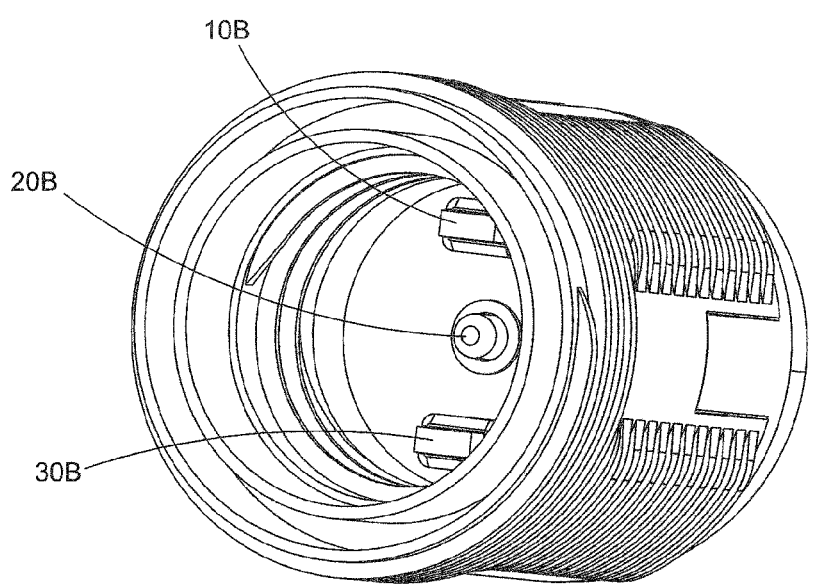
FIG. 11 is a perspective view of a power supply connection structure device according to an alternative mode of the above second preferred embodiment of the present invention.
Figure 12:
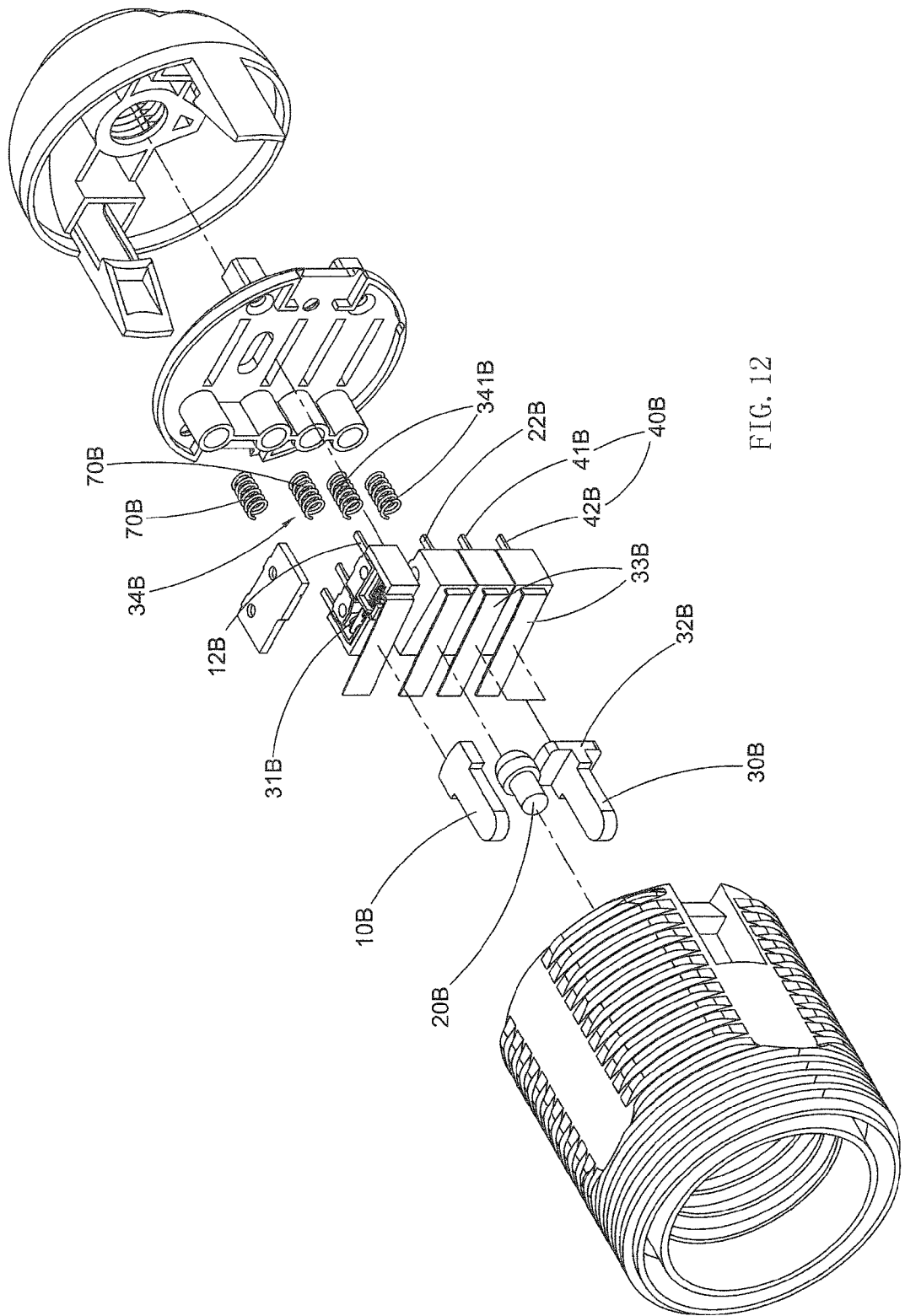
FIG. 12 is an exploded view of the power supply connection structure device according to the alternative mode of the above second preferred embodiment of the present invention.
Figure 13:
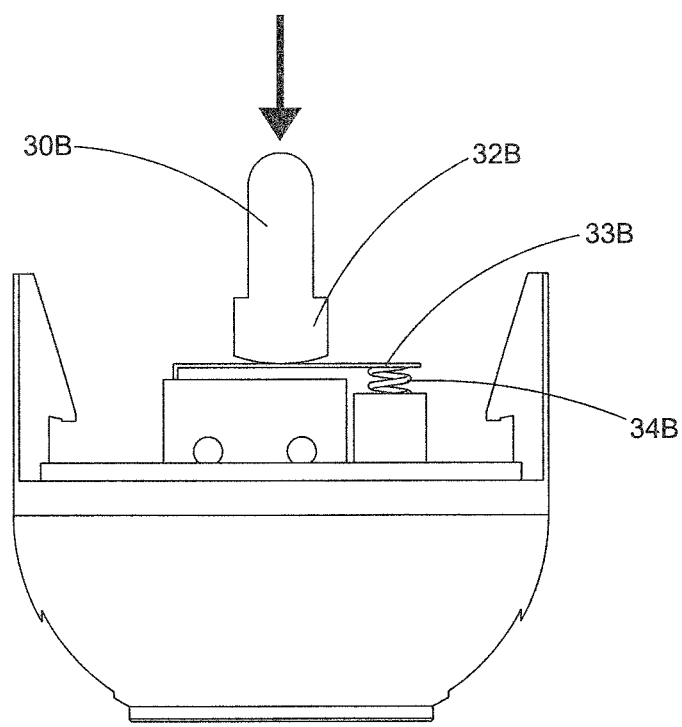
FIG. 13 a schematic view illustrating the power supply connection structure device in an activation state according to the alternative mode of the above second preferred embodiment of the present invention.

Referring to FIGS. 11 to 13 of the drawings, according to an alternative mode of the present invention, the control unit 30B further comprises a push member 32B and two actuation members 33B which are capable of providing reciprocating movement. The two actuation members 33B are parallelly and spacedly coupled to the push member 32B. The two micro-switches 31B are respectively coupled to the two actuation members 33B in such a manner that when the two actuation members 33B are driven by said push member 32B to move, the two micro-switches 31B are respectively driven by the two actuation members 33B to switch on, so that the live wire connection terminal 12B is electrically connected with the live wire access terminal 41B and the neutral wire connection terminal 22B is electrically connect with the live and neutral wire access terminal 42B respectively. It is worth mentioning that the push member 32B can be embodied as a push shaft in this second preferred embodiment.

It is worth mentioning that the control unit 30B further comprises a reposition arrangement 34B, as shown in FIG. 12 of the drawings. The two actuation members 33B return to their original positions by means of the reposition arrangement 34B, so that the two micro-switches 31B are respectively driven to be switched off by the two actuation members 33B. The first and second electric connection unit s10B and 20B, i.e. the live wire plug column and the neutral wire plug column, are also respectively coupled to a spring member 70B.

More specifically, the reposition arrangement 34B is a resilient arrangement comprising two springs 341B. A first end of each spring 341B is connected to an actuation member 33B and a second end thereof can be connected to the electric circuit arrangement 40B or the housing. Therefore, when the plugholes of the lighting lamp are respectively coupled with the first and second plug columns, the push member 32B presses the two actuation members 33B and the two springs are compressed, so that the two micro-switches are switched on to electrically connect the live wire connection terminal 12B with the live wire access terminal 41B and to electrically connect the neutral wire connection terminal 22B with the neutral wire access terminal 42B respectively. When the lighting lamp is detached from the lamp socket, the push member 32B is released and the two springs 341B restore to their original positions respectively, wherein the two actuation members 33B are driven to return to their original positions respectively, and then the two micro-switches 31B are switched off, so that the live wire connection terminal 12B is electrically disconnected with the live wire access terminal 41B and the neutral wire connection terminal 22B is also electrically disconnected with the neutral wire access terminal 42B.

Figure 14:
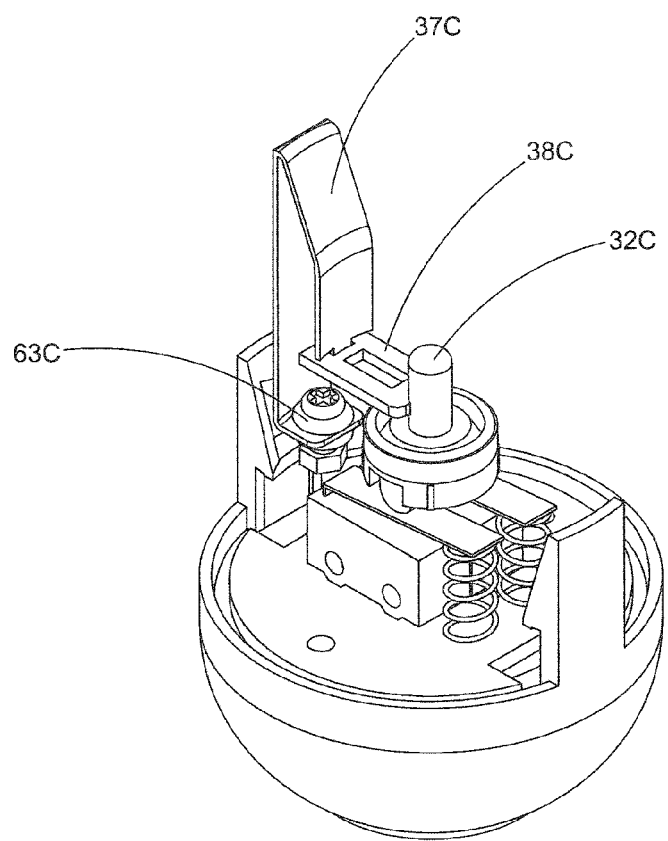
FIG. 14 is a perspective view of a power supply connection structure device according to another alternative mode of the above second preferred embodiment of the present invention.
Figure 15:
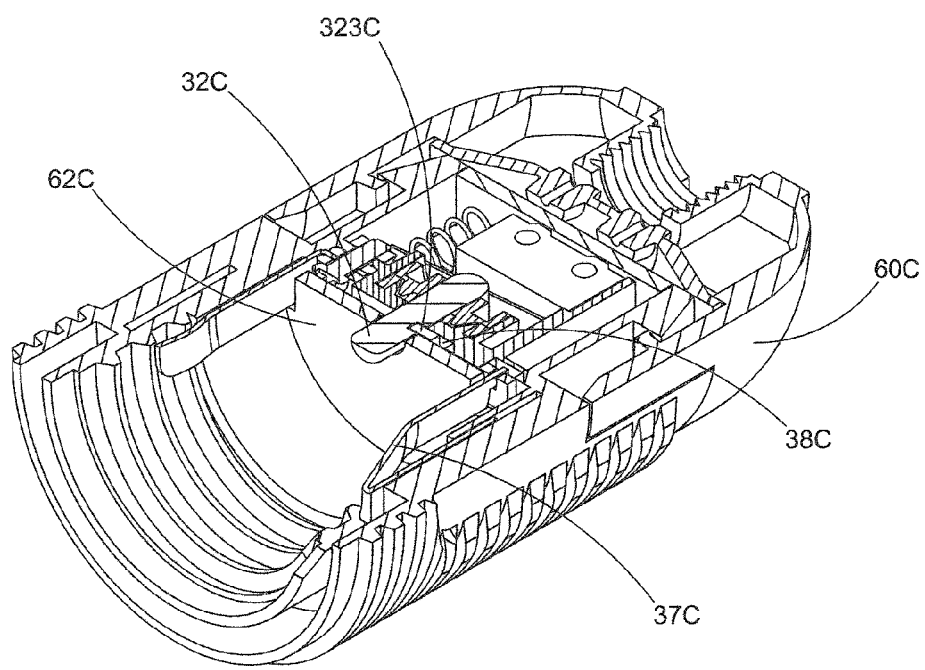
FIG. 15 is a sectional view of the power supply connection structure device according to another alternative mode of the above second preferred embodiment of the present invention.
Figure 16:
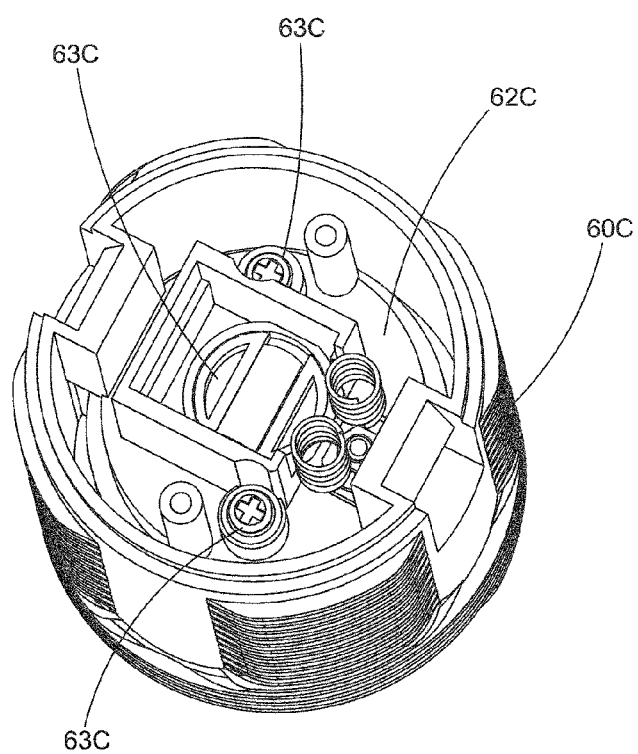
FIG. 16 is a schematic view illustrating the partition arrangement of the housing of the power supply connection structure device according to another alternative mode of the above second preferred embodiment of the present invention.
Figure 17:
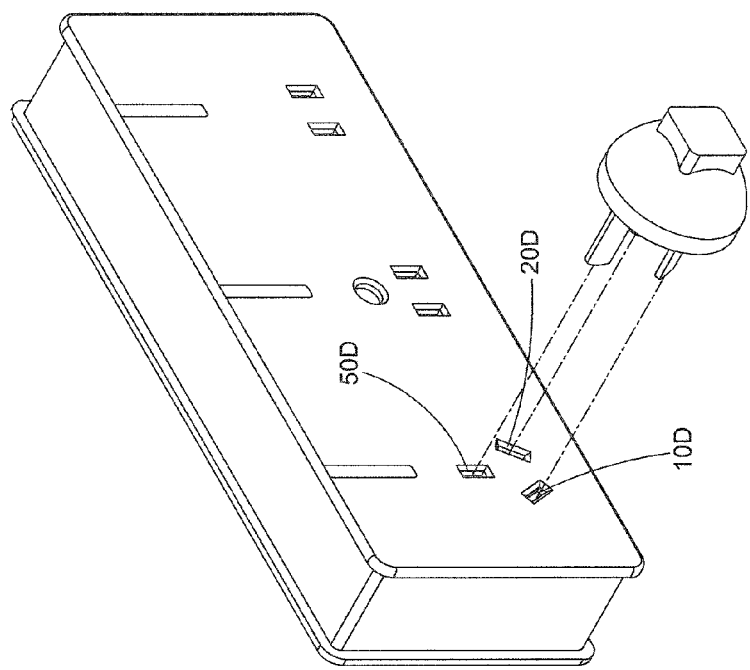
FIG. 17 is a perspective view of a power supply connection structure device according to a third preferred embodiment of the present invention.
Figure 18:
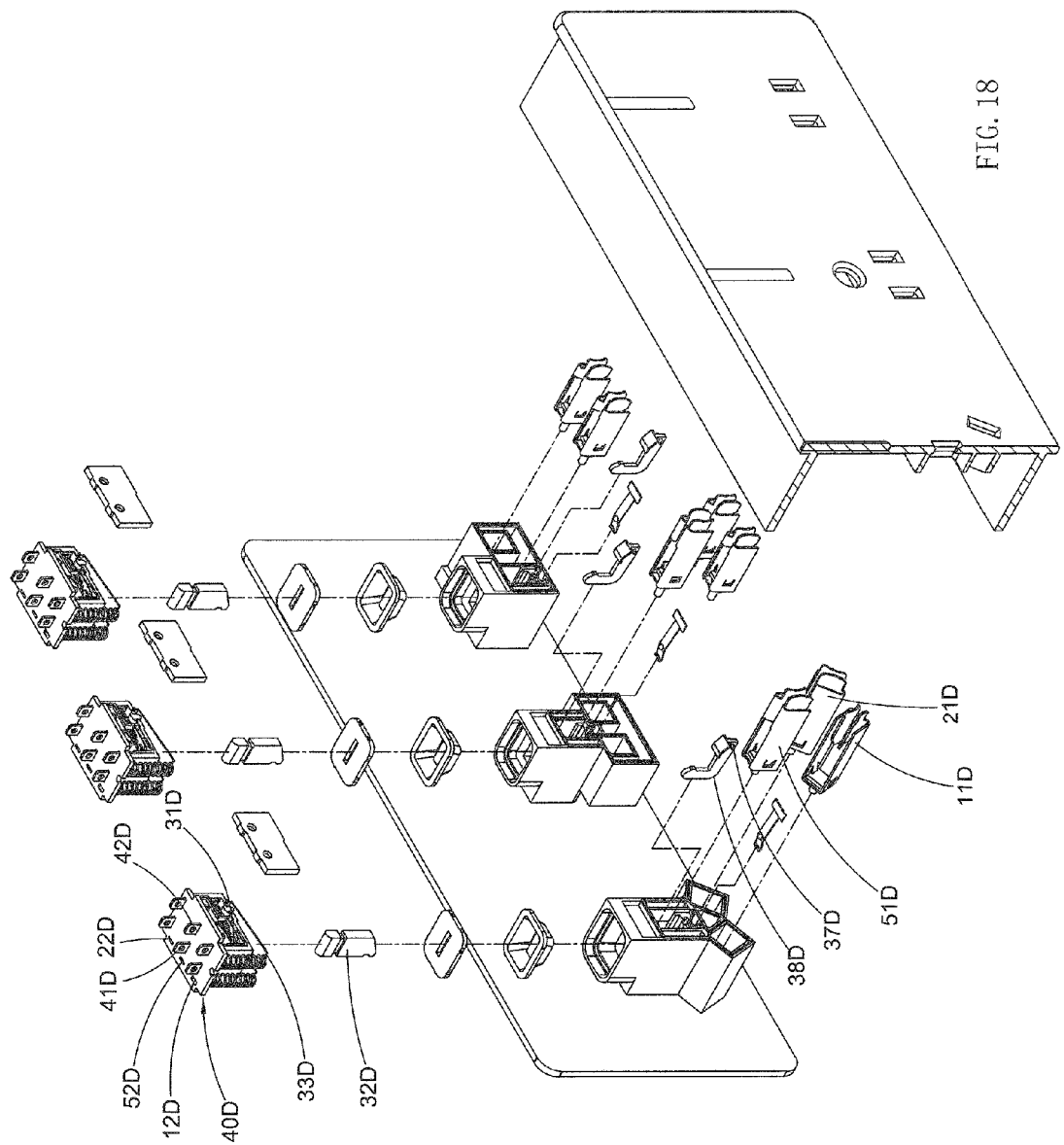
FIG. 18 is an exploded view of the power supply connection structure device according to the above third preferred embodiment of the present invention.

Referring to FIGS. 14 to 16 of the drawings, a control unit 30C according to another preferred embodiment of the present invention is illustrated. The control unit 30C comprises an activation mechanism. More specifically, the control unit comprises an activation arm 37C and a stopper arm 38C. The push member 32C has a slot 323C, wherein a first end of the stopper arm 38C is detachably coupled in the slot 323C. A second end of the stopper arm 38C can be vertically connected to the activation arm 37C in such a manner that the stopper arm 38C can be driven by the activation arm 37C to displace. Therefore, when coupling with the lighting lamp, the activation arm 37C is pressed to drive the stopper arm to move to detach from the push member 32C, so that the push member 32C applies an pressing force to the activation members 33C to switch on the micro-switches, so that a safe use of the lamp socket is further ensured and electric shock to any individual is prevented.

In addition, the lamp socket 60C comprises a housing 60C which includes a partition arrangement 62C made of waterproof material. The electric circuit arrangement 40C and the plug columns of the lamp socket are provided at two opposing sides of the partition arrangement 62C. In addition, the housing 60C may further comprise a plurality of waterproof silicon dioxide seal 63C for preventing water from having access to the side of the lamp socket which is adjacent to the electric circuit arrangement 40C, so that the lamp socket is provided with a waterproof ability.

Referring to FIGS. 17 to 20 of the drawings, a power supply connection structure device embodied as an electric socket according to a third preferred embodiment of the present invention is illustrated. Preferably, the electric socket can be a three-hole electric socket. The power supply connection structure device comprises a first electric connection unit 10D, a second electric connection unit 20D and a control unit 30D. When the control unit 30D is in an activation state, the control unit 30D electrically connects the first and second electric connection units 10D and 20D to the power source, so that the electric circuit between the power supply connection structure device, the electrical appliance and the power source is connected, and thus the power source supplies electric power to the electrical appliance.

Figure 20:
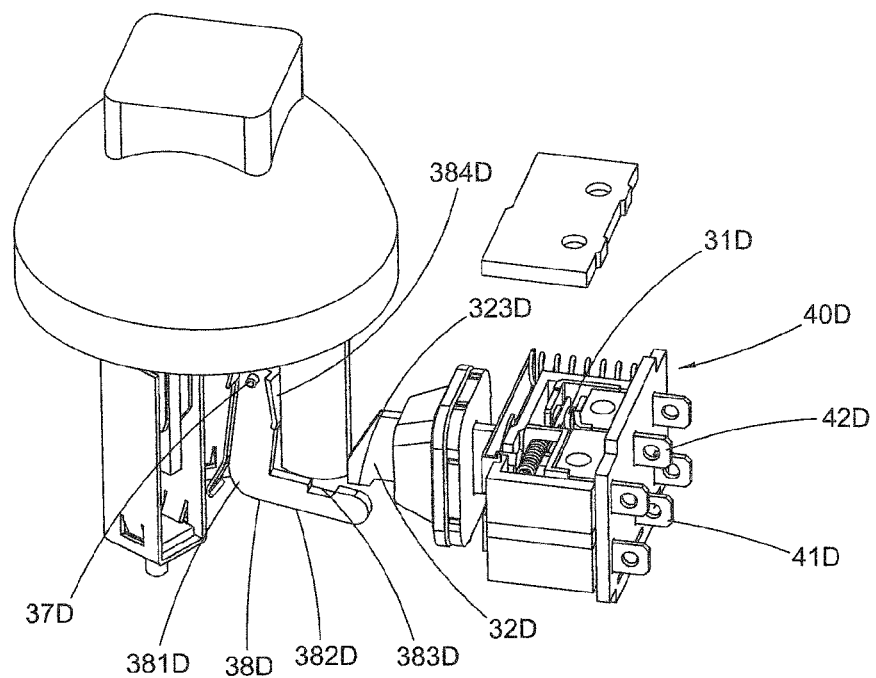
FIG. 20 is a schematic view illustrating the plug pin of an electrical appliance being inserted into the plughole of the power supply connection structure device according to the above third preferred embodiment of the present invention.

The first electric connection unit 10D is a live wire connection unit having a live wire plughole 11D and including a live wire connection terminal 12D. The second electric connection unit 20D is a neutral wire connection unit having a neutral wire plughole 21D and including a neutral wire connection terminal 22D. Accordingly, the three-hole electric socket, which is a three-phase electric socket, further comprises a ground wire connection unit 50D which has a ground wire plughole 51D and includes a ground wire connection terminal 52D. Thus, as shown in FIG. 20 of the drawings, when the plug pins of the electrical appliances are respectively inserted and received in the live wire plughole 11D, the neutral wire plughole 21D and the ground wire plughole 51D, the plug pins of the electrical appliances are electrically connected to the live wire connection terminal 12D, the neutral wire connection terminal 22D and the ground wire connection terminal 52D respectively.

The first and second electric connection units 10D and 20D are arranged for electrically connecting to the power source for forming the electric circuit. The power source may be a DC electric power source, so that the first and second electric connection units 10D and 20D are respectively arranged for electrically connecting to the positive and negative electrodes of the DC electric power source. According to this preferred embodiment of the present invention, the power source is an AC electric power source, and the first and second electric connection units 10D and 20D are respectively a live wire connection unit and a neutral wire connection unit.

In this embodiment, the power supply connection structure device further comprises an electric circuit arrangement 40D which may be embodied as an electric circuit board and includes a live wire access terminal 41D and a neutral wire access terminal 42D. The control unit 30D controls two micro-switches 32D. When the control unit 30 is in the activation state, one of the two micro-switches 32D electrically connects the live wire connection unit 10D with the live wire access terminal 41D, and the other micro-switch 32D electrically connects the neutral wire connection unit 20D with the neutral wire access terminal 42D, so that the electric circuit between the power supply connection structure device, the electrical appliance and the power source is connected.

The first electric connection unit 10D is a live wire connection unit having a live wire plughole 11D and including a live wire connection terminal 12D. The second electric connection unit 20D is a neutral wire connection unit having a neutral wire plughole 21D and including a neutral wire connection terminal 22D. Accordingly, the three-hole electric socket, which is a three-phase electric socket, further comprises a ground wire connection unit 50D which has a ground wire plughole 51D and includes a ground wire connection terminal 52D. Thus, when the plug pins of the electrical appliances are respectively inserted and received in the live wire plughole 11D, the neutral wire plughole 21D and the ground wire plughole 51D, the plug pins of the electrical appliances are respectively electrically connected to the live wire connection terminal 12D, the neutral wire connection terminal 22D and the ground wire connection terminal 52D.

Accordingly, the three-hole electric socket further comprises an electric circuit arrangement 40D which includes a live wire access terminal 41D and a neutral wire access terminal 42D. The control unit 30D controls two micro-switches 32D. When the control unit 30D is in the activation state, one of the two micro-switches 32D electrically connects the live wire connection unit 10D with the live wire access terminal 41D, and the other micro-switch 32D electrically connects the neutral wire connection unit 20D with the neutral wire access terminal 42D (similar to the above first preferred embodiment), so that the electric circuit between the power supply connection structure device, the electrical appliance and the power source is connected.

Figure 19:
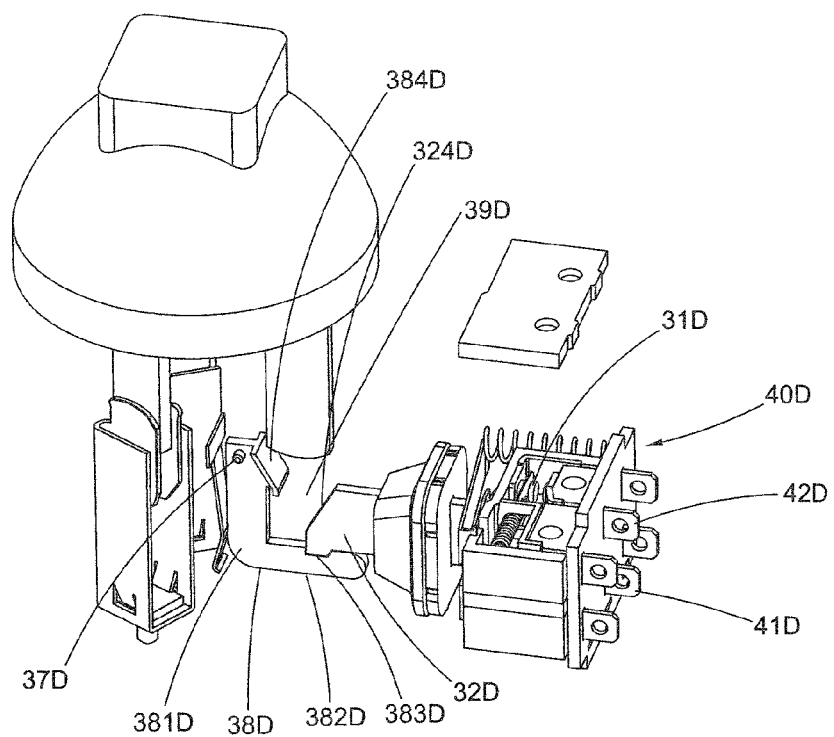
FIG. 19 is a schematic view illustrating the plug pin of an electrical appliance being about to insert into the plughole of the power supply connection structure device according to the above third preferred embodiment of the present invention.

More specifically, as shown in FIGS. 19 and 20 of the drawings, when the control unit 30D is an idle state, and the plug pins are merely inserted and received in the live wire plughole 11D and the neutral wire plughole 21D, the plug pins are respectively electrically connected to the live wire connection terminal 12D and the neutral wire connection terminal 22D. However, the live wire connection terminal 12D and the neutral wire connection terminal 22D are not respectively electrically connected to the live wire access terminal 41D and the neutral wire access terminal 42D of the electric circuit arrangement 40D, so that the electric circuit between the power supply connection structure device, the electrical appliance and the power source is not electrically connected.

When the control unit 30D is in the activation state, the live wire connection terminal 12D and the neutral wire connection terminal 22D are respectively electrically connected to the plug pins, and the control unit 30D is arranged for switching on the two micro-switches 31D between the live and neutral wire connection terminals 12D and 22D, and the live and neutral wire access terminals 41D and 42D of the electric circuit arrangement 40D respectively, so that the electric circuit between the power supply connection structure device and the electrical appliance is connected. When the power source is electrically connected to the power supply connection structure device, the electrical appliance is supplied with electric power for operation.

It is worth mentioning that the mechanism for the control unit 30D to switch on or switch off the two micro-switches 31D can be embodied in various ways. According to this preferred embodiment of the present invention, as shown in FIGS. 17-20 of the drawings, the control unit 30D coupled to the ground wire connection unit 50D comprises a push member 32D and two actuation members 33D which are capable of providing reciprocating movement. The two actuation members 33D are parallelly and spacedly coupled to the push member 32D. The two micro-switches 31D are respectively coupled to the two actuation members 33D, so that when the two actuation members 33D are driven by said push member 32D to move, the two micro-switches 31D are respectively driven by the two actuation members 33D to switch on, so that the live wire connection terminal 12D is electrically connected to the live wire access terminal 41D and the neutral wire connection terminal 22D is electrically connected with the neutral wire access terminal 42D. It is worth mentioning that the push member 32D can be embodied as a push shaft in this preferred embodiment.

It is worth mentioning that the control unit 30D provides a hook releasing mechanism. More specifically, the control unit 30D further comprises a retention pivot 37D and a retention element 38D pivotally and rotatably coupled to the retention pivot 37D in such a manner that an opening 39D is formed between the retention element 38D and the push member 32D. In addition, the retention element 38D is detachably mounted to push member 32D, so that when a plug pin is inserted and received in the opening 39D, the push member 32D is detached from the retention element 38D, so as to drive the activation members 33D to switch on the micro-switches 32A respectively. The retention element 38d rotates with respect to the retention pivot 37D and enables the plug pin to electrically connect to the ground wire connection terminal 52D at the ground wire connection plughole 51D.

Preferably, the width of the opening 39D can be substantially the same as the width of a plug pin of a plug. In other words, the opening 39D just allows a plug pin of a plug inserting into the ground wire plughole 51D for pushing away the retention element 38D to detach the push member 32D from the retention element 38D, wherein the pressing force from the plug pin of the plug can be applied to the activation members 33D to switch on the micro-switches 31D respectively.

Referring to FIGS. 19 and 20 of the drawings, the retention element 38D comprises a retainer arm 381D and an actuator arm 382D extended from the retainer arm 381D. The actuator arm 382D is detachably coupled with the push member 32D. The detachable mounting manner can be achieved via various structures. According to this preferred embodiment, the actuator arm 382D has a groove 383D. Correspondingly, the push member 32D is provided with a hook 323D which is adapted for detachably engaging with the groove 383D, so that the actuator arm 382D is detachably mounted with the push member 32D. When the plug pin of the plug is inserted and received in the opening 39D, the plug pin forces the hook 323D to leave the groove 383D, and the push member 32D which is pressed by the plug pin pushes inwardly to switch on the micro-switches 31D.

Alternatively, the actuator arm 382D is provided with the hook while the push member 32D has the groove, so that the actuator arm 382D is also detachably mounted with the push member 32D. It is worth mentioning that the hook and the actuator arm 382D may define a predetermined angle with respect to each other, so that there is no influence for the plug pin of the plug to pass through the opening 39D to electrically connect to the ground wire connection terminal.

In addition, the retainer arm 381D may be provided with a guide arm 384D, and the push member 32D has a guide surface 324D for guiding the plug pin of the plug to slide into the opening 39D. The retainer arm 381D may be further provided with a metal resilient plate for retracting the retention element 38D to its original position.

Similar to the above first preferred embodiment, the control unit 30D further comprises a reposition arrangement 34D. The two actuation members 33D return to their original positions by means of the reposition arrangement 34D, so that the two micro-switches 31D can be respectively driven to switch off by the two actuation members 33D respectively.

More specifically, the reposition arrangement 34D is a resilient arrangement comprising two springs 341 D. A first end of each spring 341D is connected to an actuation member 33D and a second end thereof can be connected to the electric circuit arrangement 40D or the housing. Therefore, when a plug pin of the electrical appliance, which is a ground wire connection plug pin according to this preferred embodiment, is inserted and received in the ground wire plughole 51D, wherein the push member 32D presses the two actuation members 33D and the two springs 341D are compressed, so that the two micro-switches 31D are switched on to electrically connect the live wire connection terminal 12D with the live wire access terminal 41D and to electrically connects the neutral wire connection terminal 22D with the neutral wire access terminal 42D respectively. When the plug pin of the electrical appliance is removed from the ground wire plughole 51D, the push member 32D is released and the two springs 341D restore to their original positions respectively, wherein the two actuation members 33D are driven to return to their original positions respectively, and then the two micro-switches 31D are switched off, so that the live wire connection terminal 12D is electrically disconnected with the live wire access terminal 41D and the neutral wire connection terminal 22D is electrically disconnected with the neutral wire access terminal 42D.

In other words, the electrical connection between the plug pins of the electrical appliance and the live and neutral wire connection terminals 12D and 22D are able to electrically connect the electrical appliance with the power supply connection structure device of the present invention. Only when the control unit 30D which is coupled to the ground wire connection unit 50D is activated to switch on the two micro-switches, the electric circuit between the electrical appliance and the power supply connection structure device of the present invention can be electrically connected.

Accordingly, the push member 32D and the actuation members 33D are made of insulation materials. Each of the actuation members comprises an actuation arm 331D and a drive arm 332D extended from the actuation arm 331D. The actuation arm 331D is driven by the push member 32D and the reposition arrangement 34D to reciprocate. Each of the micro-switches 31D may comprise a resilient element 311D, which can be a spring, and an electric connection element 312D, which can be an electric conductive element. One of the micro-switches 31D operates as a switch to electrically connect the live wire connection terminal 12D with the live wire access terminal 41D and the other micro-switch also operates as a switch to electrically connect the neutral wire connection terminal 22D with the neutral wire access terminal 42D.

In other words, when the push member 32D is pressed, the actuation arm 331D is driven by the push member 32D to drive the drive arm 332D to press the resilient element 311D, and then the resilient element 311D drives the electric connection element 312D to move, so as to electrically connect the live wire connection terminal 12D with the live wire access terminal 41D and to electrically connect the neutral wire connection terminal 22D, and the neutral wire access terminal 42D.

Figure 21:
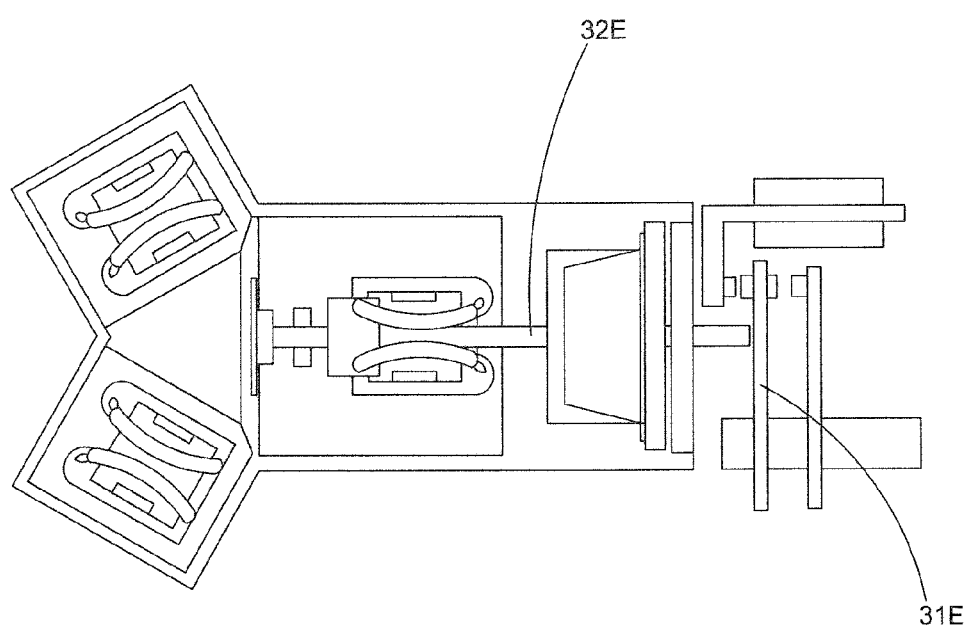
FIG. 21 is a perspective view of a power supply connection structure device according to another alternative mode of the above third preferred embodiment of the present invention.

Referring to FIG. 21 of the drawings, according to an alternative mode of the above third preferred embodiment of the present invention, the structure is similar to the power supply connection structure device of the above third preferred embodiment of the present invention. The difference is that the push member 32E directly pushes the micro-switches 31E to connect the electric circuit. More specifically, each of the micro-switches can be a metal resilient plate and may provide a retaining function by the plastic metal resilient plate. More specifically, when the plug pin of the plug gets out of the plug hole of the electric socket, the push member 32D return to its original position by means of the resilient retracting ability of the metal resilient plate.

One skilled in the art will understand that the embodiments of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An electric connection device for electrically connecting an electrical appliance to a power source, comprising:
   a live wire connecting unit having a live wire plughole and including a live wire connection terminal electrically connected to said live wire plughole;
   a neutral wire connecting unit having a neutral wire plughole and including a neutral wire connection terminal electrically connected to said neutral wire plughole;
   a ground wire connecting unit having a ground wire plughole and including a ground wire connection terminal electrically connected to said ground wire plughole;
   an electric circuit arrangement comprising a live wire access terminal and a neutral wire access terminal; and
   a control unit adapted to be shifted between an idle state and an activation state, whereby in said idle state, said live wire connecting unit and neutral wire connecting units are not connected to the power source and, in said activation state, said control unit electrically connect said live wire connecting unit and said neutral wire connecting unit to the power source, so as to electrically connect an electric circuit between said electric connection device, the power source and the electrical appliance, wherein said control unit comprises:
   a push member extending into said ground wire plughole;
   two micro-switches arranged in such a manner that when said live wire plughole, said neutral wire plughole and said ground wire plughole respectively receive three plug pins of the electrical appliance until the three plug pins are respectively electrically connected to said live wire connection terminal, said neutral wire connection terminal and said ground wire connection terminal, said control unit is in said activation state that said push member is arranged to be pushed by one of the three plug pins which is received in said ground wire plughole to switch on said two micro-switches to electrically connect said live wire connection terminal with said live wire access terminal, and to electrically connect said neutral wire connection terminal with said neutral wire access terminal respectively, so as to electrically connect said electric circuit between said electric connection device, the electrical appliance and the power source, wherein when said control unit is in said idle state, even though said live wire plughole and said neutral plughole respectively receive the plug pins and the plug pins are electrically connected to said live wire connection terminal and said neutral wire connection terminal respectively, said live wire connection terminal and said neutral wire connection terminal are not electrically connected to said live wire access terminal and said neutral wire access terminal of said electrical circuit arrangement; and a reposition arrangement adapted to switch off said two micro-switches of said control unit when the plug pin of the electrical appliance is removed from said ground wire plughole, wherein said live wire connection terminal and said neutral wire connection terminal are electrically disconnected with said live wire access terminal and said neutral wire access terminal respectively.

2. The electric connection device, as recited in claim 1, wherein said control unit further comprises two actuation members, wherein said two actuation members are parallelly and spacedly coupled to said push member, wherein said two micro-switches are respectively coupled to said two actuation members in such a manner that when said two actuation members are driven by said push member to move, said two micro-switches are respectively driven by said two actuation members to switch on, wherein said live wire connection terminal and said neutral wire connection terminal are electrically connected with said live wire access terminal and said neutral wire access terminal respectively.

3. The electric connection device, as recited in claim 2, wherein said reposition arrangement comprises two springs each coupling to one of said activation members, in such as a manner that when the plug pin received in said ground wire plughole, said push member presses said two actuation members and said two springs are compressed to switch on said two micro-switches so as to electrically connect said live wire connection terminal and said neutral wire connection terminal with said live wire access terminal and said neutral wire access terminal respectively, and that when the plug pin received in said ground wire plughole is removed from said ground wire plughole, said push member is released and said two springs restore to original positions thereof respectively, wherein said two actuation members are driven to return to original positions thereof respectively, and then said two micro-switches are switched off, wherein said live wire connection terminal and said neutral wire connection terminal are electrically disconnected with said live wire access terminal and said neutral wire access terminal respectively.

4. The electric connection device, as recited in claim 3, wherein each of said activation member comprises an actuation arm and a drive arm which is extended from said actuation arm, wherein said actuation arm is driven by said push member and said reposition arrangement to reciprocate, wherein each of said micro-switches comprises a resilient element and an electric connection element which is an electric conductive element, wherein one of said micro-switches operates as a switch for electrically connecting said live wire connection terminal with said live wire access terminal, and said other micro-switch operates as a switch for electrically connecting said neutral wire connection terminal with said neutral wire access terminal, wherein when said push member is pressed, said actuation arm is pressed by said push member to drive said drive arm to bias against said resilient element, wherein said resilient element forces said electric connection element to move so as to allow said electric connection elements to electrically connect said live wire connection terminal and neutral wire connection terminal with said live wire access terminal and neutral wire access terminal respectively.

5. The electric connection device, as recited in claim 1, wherein said control unit further comprises a retention pivot and a retention element pivotally and rotatably coupled to said retention pivot in such a manner that an opening is formed between said retention element and said push member, wherein said retention element is detachably mounted to push member in such a manner that when one of plug pins is inserted into said opening, said push member is detached from said retention element so as to drive said activation members to switch on said micro-switches.

6. The electric connection device, as recited in claim 4, wherein said control unit further comprises a retention pivot and a retention element pivotally and rotatably coupled to said retention pivot in such a manner that an opening is formed between said retention element and said push member, wherein said retention element is detachably mounted to push member in such a manner that when one of plug pins is inserted into said opening, said push member is detached from said retention element so as to drive said activation members to switch on said micro-switches.

7. The electric connection device, as recited in claim 5, wherein a width of said opening is substantially the same as the width of the plug pin of the electrical appliance.

8. The electric connection device, as recited in claim 6, wherein a width of said opening is substantially the same as the width of the plug pin of the electrical appliance.

9. The electric connection device, as recited in claim 5, wherein said retention element comprises a retainer arm and an actuator arm extended from said retainer arm, wherein said actuator arm is detachably coupled with said push member.

10. The electric connection device, as recited in claim 6, wherein said retention element comprises a retainer arm and an actuator arm extended from said retainer arm, wherein said actuator arm is detachably coupled with said push member.

11. The electric connection device, as recited in claim 9, wherein said actuator arm has a groove and said push member is provided with a hook which is adapted for detachably engaging with said groove in such manner that said actuator arm is detachably coupled with said push member.

12. The electric connection device, as recited in claim 10, wherein said actuator arm has a groove and said push member is provided with a hook which is adapted for detachably engaging with said groove in such manner that said actuator arm is detachably coupled with said push member.

13. The electric connection device, as recited in claim 1, further comprising a housing which includes a partition arrangement, wherein said live wire plug hole, said neutral wire plughole and said ground wire plughole are disposed at a first side of said partition arrangement, wherein said live wire access terminal and said neutral wire access terminal are disposed at an opposing second side of said partition arrangement, so as to prevent water from having contact with said live wire access terminal and said neutral wire access terminal.

14. The electric connection device, as recited in claim 4, further comprising a housing which includes a partition arrangement, wherein said live wire plug hole, said neutral wire plughole and said ground wire plughole are disposed at a first side of said partition arrangement, wherein said live wire access terminal and said neutral wire access terminal are disposed at an opposing second side of said partition arrangement, so as to prevent water from having contact with said live wire access terminal and said neutral wire access terminal.

15. The electric connection device, as recited in claim 12, further comprising a housing which includes a partition arrangement, wherein said live wire plug hole, said neutral wire plughole and said ground wire plughole are disposed at a first side of said partition arrangement, wherein said live wire access terminal and said neutral wire access terminal are disposed at an opposing second side of said partition arrangement, so as to prevent water from having contact with said live wire access terminal and said neutral wire access terminal.

16. The electric connection device, as recited in claim 13, wherein said two micro-switches are provided at said opposing second side of said partition arrangement.

17. The electric connection device, as recited in claim 14, wherein said two micro-switches are provided at said opposing second side of said partition arrangement.

18. The electric connection device, as recited in claim 15, wherein said two micro-switches are provided at said opposing second side of said partition arrangement.

19. The electric connection device, as recited in claim 1, wherein each of said micro-switches is a metal resilient plate, wherein said micro-switches are coupled to said push member in such a manner that when said push member is pushed to switch on said micro-switch, said live wire connection terminal and said neutral wire connection terminal are electrically connected with said live wire access terminal and said neutral wire access terminal respectively.

20. A method for electrically connecting an electrical appliance to a power source via an electric connection device, comprises the following steps:
(a) providing a housing having a live wire plughole, a neutral wire plughole and a ground wire plughole thereon and defining a receiving cavity therein;
(b) coupling a live wire connecting terminal, a neutral wire connecting terminal and a ground wire connecting terminal with said live wire plughole, said neutral wire plughole and said ground wire plughole respectively, and disposing an electric circuit arrangement in said receiving cavity, wherein said electric circuit arrangement comprises a live wire access terminal and a neutral wire access terminal;
(c) configuring a control unit comprising two micro-switches, wherein when said two micro-switches are switched on, one of said two micro-switches electrically connects said live wire connection terminal with said live neutral wire access terminal, and that said other micro-switch electrical connects said neutral wire access terminal with said neutral wire access terminal, so that an electric circuit between said electric connection device, said power source, and said electrical appliance is electrically connected;
(d) receiving three plug pins of said electrical appliance in said live wire plughole, said neutral wire plughole and said ground wire plughole respectively for electrically connecting said three plug pins to said live wire connecting terminal, said neutral wire connecting terminal and said ground wire connecting terminal respectively;
(e) switching on said two micro-switches when said plug pin received in said ground wire plughole pushes a push member of said control unit, so as to electrically connect said live wire connection terminal with said live wire access terminal and to electrically connect said neutral wire connection terminal with said neutral wire access terminal respectively, so that said electric circuit between said electric connection device, said power source, and said electrical appliance is connected; and
(f) switching off said two micro-switches when said plug pin received in said ground wire plughole is removed from said ground wire plughole, said live wire connection terminal and said neutral wire connection terminal are electrically disconnected with said live wire access terminal and said neutral wire access terminal respectively, wherein when only one or both of said live wire plughole and said neutral wire plughole are inserted with electric conductive objects while said push member is not being pushed, said objects are not electrically connected to said live wire access terminal and said neutral wire access terminal, so that said electric circuit between said electric connection device, said power source, and said electrical appliance is not connected.

* * * * *